(12) United States Patent
Wang et al.

(10) Patent No.: US 11,934,249 B2
(45) Date of Patent: Mar. 19, 2024

(54) METHODS AND APPARATUS TO MANAGE ENERGY USAGE AND COMPUTE PERFORMANCE

(71) Applicant: Intel Corporation, Santa Clara, CA (US)

(72) Inventors: Zhongsheng Wang, Camas, WA (US); Chris Binns, Hillsboro, OR (US); Deepak Samuel Kirubakaran, Hillsboro, OR (US); Ashraf H Wadaa, Beaverton, OR (US); Rajshree Chabukswar, Sunnyvale, CA (US); Ahmed Shams, Tigard, OR (US); Sze Ling Yeap, Hillsboro, OR (US); Refael Mizrahi, Raanana (IL); Nicholas Klein, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/710,525

(22) Filed: Mar. 31, 2022

(65) Prior Publication Data
US 2022/0221925 A1    Jul. 14, 2022

(51) Int. Cl.
*G06F 1/3234*        (2019.01)
*G06F 9/50*          (2006.01)
(Continued)

(52) U.S. Cl.
CPC .......... *G06F 1/3234* (2013.01); *G06F 9/5094* (2013.01); *G06F 11/3062* (2013.01); *G06N 20/00* (2019.01)

(58) Field of Classification Search
CPC .. G06F 1/3234; G06F 9/5094; G06F 11/3062; G06N 20/00
See application file for complete search history.

(56) References Cited

U.S. PATENT DOCUMENTS 9,075,610 B2 *   7/2015  Weissmann ........... G06F 1/3243
10,877,786 B1 * 12/2020  Dunagan ............... H04L 43/065
(Continued)

OTHER PUBLICATIONS

European-Commission, "Energy labelling requirements for computers and computer servers", published Mar. 9, 2018, 2 pages, (Retrieved from https://ec.europa.eu/info/law/better-regulation/have-your-say/initiatives/1580-Energy-labelling-requirements-for-computers-and-computer-servers_en on Mar. 14, 2022.).

(Continued)

*Primary Examiner* — Aurel Prifti
(74) *Attorney, Agent, or Firm* — Hanley, Flight & Zimmerman, LLC

(57) ABSTRACT

Methods, apparatus, systems, and articles of manufacture are disclosed. In one example, a compute device to manage energy usage and compute performance includes at least one memory, instructions, and processor circuitry. The processor circuitry executes the instructions to determine a system power mode based on first telemetry data associated with the compute device. The processor circuitry executes the instructions to provide user activity data and second telemetry data associated with the compute device to a classification system. The processor circuitry executes the instructions to configure a plurality of parameters to manage power consumption and performance of the compute device based on a classification by the classification system.

21 Claims, 12 Drawing Sheets

(51) Int. Cl.
    *G06F 11/30*     (2006.01)
    *G06N 20/00*     (2019.01)

(56) References Cited

U.S. PATENT DOCUMENTS

| | | | | |
|---|---|---|---|---|
| 2003/0233591 | A1* | 12/2003 | Chiteboun | G06F 3/038 |
| | | | | 713/300 |
| 2007/0055899 | A1* | 3/2007 | Wei | G06F 1/3203 |
| | | | | 710/312 |
| 2011/0159931 | A1* | 6/2011 | Boss | G06F 1/3212 |
| | | | | 455/574 |
| 2013/0152097 | A1* | 6/2013 | Boctor | G06F 9/505 |
| | | | | 718/103 |
| 2016/0261131 | A1* | 9/2016 | Childress | H02J 7/0069 |
| 2016/0357600 | A1* | 12/2016 | Chimene | G06F 9/526 |
| 2018/0203562 | A1* | 7/2018 | An | G06F 1/3218 |
| 2018/0351390 | A1* | 12/2018 | Venkatraman | H04B 5/0075 |
| 2019/0033947 | A1* | 1/2019 | Chan | G06F 1/3212 |
| 2019/0086988 | A1* | 3/2019 | He | G06F 1/3212 |
| 2020/0218329 | A1* | 7/2020 | Nagarajan | G06F 1/3234 |
| 2021/0089109 | A1* | 3/2021 | Iyer | H02J 7/04 |
| 2021/0357376 | A1* | 11/2021 | Jain | G06F 16/285 |
| 2022/0011847 | A1* | 1/2022 | Senoo | G06F 1/3228 |
| 2022/0236782 | A1* | 7/2022 | Viswanathan | H04N 7/147 |
| 2022/0261295 | A1* | 8/2022 | Nagaraja | G06F 18/23 |
| 2023/0069593 | A1* | 3/2023 | Sherwood, Jr. | G06F 9/5027 |

OTHER PUBLICATIONS

Lyles, Taylor, "US States Ban Certain Alienware PCT Sales Because They Use Too Much Power" IGN, published Mar. 14, 2021, updated Jul. 28, 2021, posted Jul. 28, 2021, 2 pages. (Retrieved from https://www.ign.com/articles/dell-alienware-gaming-pcs-six-states-power-consumption-ban).

Smith, Brad, "Microsoft will be carbon negative by 2030," The Official Microsoft Blog, dated Jan. 16, 2020, 10 pages. (Retrieved from https://blogs.microsoft.com/blog/2020/01/16/microsoft-will-be-carbon-negative-by-2030/ on Mar. 14, 2022.).

* cited by examiner

700 →

|  | DEFAULT | GEAR 1 | GEAR 2 | GEAR 3 | GEAR 4 | GEAR 5 |
|---|---|---|---|---|---|---|
| PCMARK 10 SCORE | 6045 | 5725 | 5571 | 5416 | 5214 | 4894 |
| SOC POWER (W) | 14.9 | 13.27 | 12.39 | 11.63 | 10.81 | 10.11 |
| PERF/WATT | 405.7 | 431.4 | 449.6 | 465.7 | 482.3 | 484.1 |
| PERFORMANCE (%) | 100.0% | 94.7% | 92.2% | 89.6% | 86.3% | 81.0% |
| PERFORMANCE PER WATT IMPROVEMENT | 100.0% | 106.3% | 110.8% | 114.8% | 118.9% | 119.3% |

802 →

| | | STATIC EPP VALUE | | | | | | | TEST 4 | | TEST 5 | | TEST 9 | |
|---|---|---|---|---|---|---|---|---|---|---|---|---|---|---|
| | | EPP33 | EPP50 | Δ33 | EPP70 | Δ33 | EPP80 | Δ33 | GEAR 5 | Δ33 | GEAR 5.1 | Δ33 | GEAR 5.5 | Δ33 |
| TEAMS 1x1 | POWER | 4.6 | 4.25 | -8% | 3.89 | -15% | 3.78 | -18% | 3.87 | -16% | 3.78 | -18% | 3.78 | -18% |
| TEAMS 3x3 | POWER | 6.88 | 6.43 | -7% | 5.15 | -25% | 5.01 | -27% | 6.34 | -8% | 5.18 | -25% | 5.18 | -25% |
| TEAMS 3x3 (SS-PP) | POWER | 7.16 | 6.15 | 14% | 5.01 | -30% | 4.91 | -31% | 5.07 | -29% | 4.92 | -31% | 4.92 | -31% |
| TEAMS 3x3 CALL ONLY (W/ PCMARK10) | PERF | 5465 | 5452 | 0% | 4285 | -22% | 3656 | -33% | 4898 | -10% | 4255 | -22% | 3906 | -29% |
| | POWER | 16.38 | 15.38 | -6% | 9.68 | -41% | 7.82 | -52% | 12.56 | -23% | 9.71 | -41% | 9.11 | -44% |

804 →

| | BURSTY & < 10% FG = EPP 70, <99% FG = EPP 60 | BURSTY & <=99% = EPP 80 (EPP 55) | BURSTY & <=150% = EPP 80 (EPP 60) |
|---|---|---|---|
| P1 EPP 40/30 | 0% | 0% | 0% |
| P2 EPP 50 | 2% | 3% | 2% |
| P3 EPP 55 | 27% | 26% | 0% |
| P4 EPP 60 | 28% | 0% | 19% |
| P5 EPP 70 | 43% | 4% | 0% |
| P6 EPP 80 | 0% | 67% | 79% |

FIG. 8

METHODS AND APPARATUS TO MANAGE ENERGY USAGE AND COMPUTE PERFORMANCE

FIELD OF THE DISCLOSURE

This disclosure relates generally performance management and, more particularly, to methods and apparatus to manage energy usage and compute performance.

BACKGROUND

Modern compute devices are often associated with massively parallel processors, hardware accelerators, and high resolution displays. Such hardware improves performance but increases energy consumption, reducing the utility of portable systems dependent on limited-capacity batteries. Therefore, computer architects, hardware manufacturers, and software developers carefully consider performance and energy consumption when designing devices.

BRIEF DESCRIPTION OF THE DRAWINGS

FIG. 8 is a table illustrating example performance improvements when executing video collaboration software on the system 100 of FIG. 1.

In general, the same reference numbers will be used throughout the drawing(s) and accompanying written description to refer to the same or like parts. The figures are not to scale.

Figure 1:
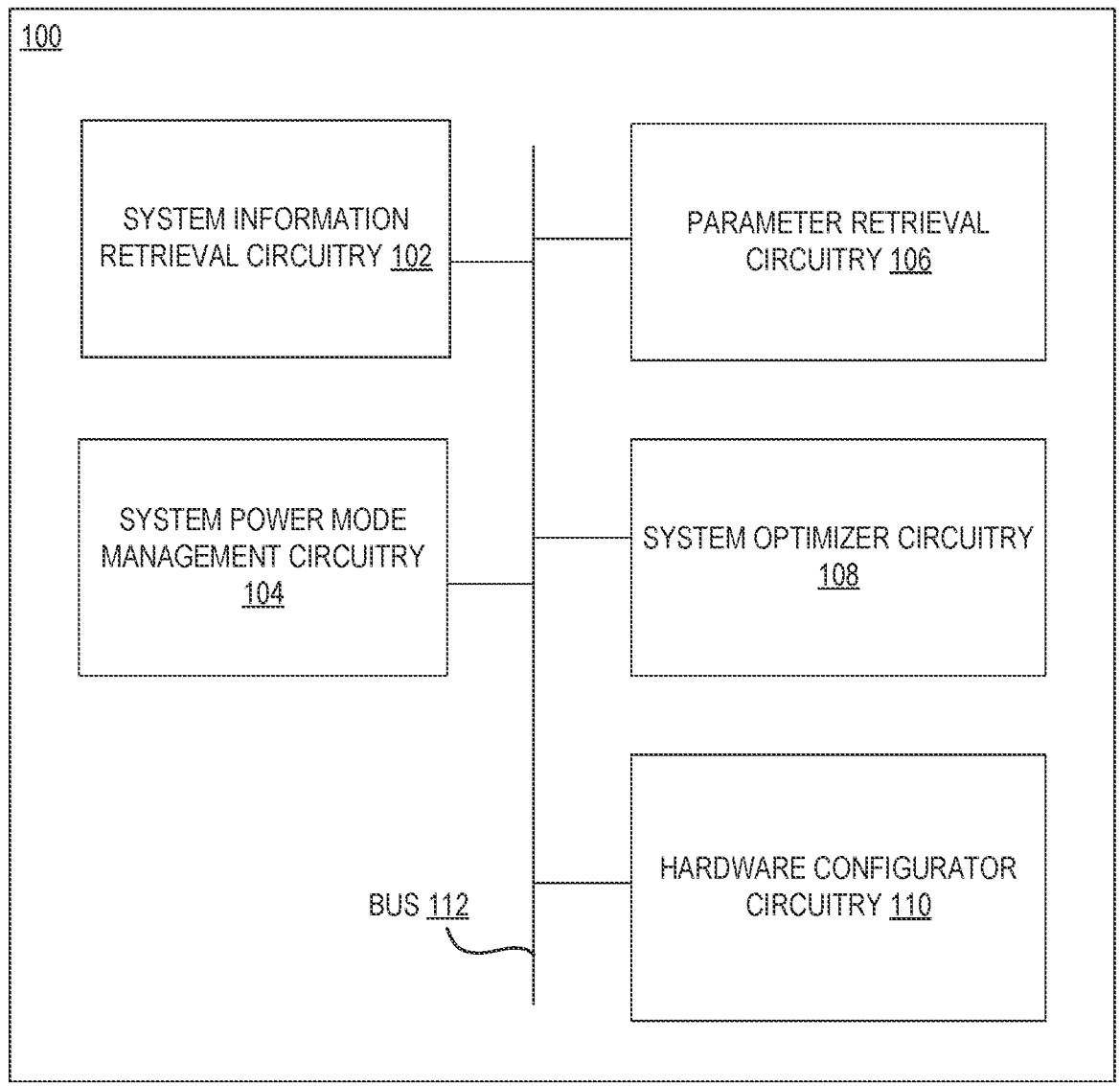
FIG. 1 is a block diagram of an example system 100 to manage energy and performance for a computing device.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Modern computing workloads (e.g., machine learning, internet-of-things, virtual reality, blockchain, etc.) are associated with substantially increased energy consumption. To execute such workloads while meeting energy efficiency standards (e.g., governmental energy standards, industrial energy standards), computer manufacturers carefully balance performance and energy usage.

Maintaining the energy-performance balance is especially difficult when user behaviors reduce energy efficiency. For example, many users tune desktop personal computers (PCs) to high performance while connected to an alternating current (AC) power source, regardless of workload type. Tuning a PC to performance mode (e.g., increased processor frequency) increases energy consumption, heat, and fan noise. Configuring a PC in performance mode often wastes energy, as many workloads do not utilize the extra performance. Even in PCs without batteries, energy waste is associated with negative environmental effects.

These trends have significantly influenced computer architecture design. Computers are now often designed to optimize performance per watt. Yet, even optimized hardware will underperform when used inefficiently. Conventional systems often deliver max performance without improving energy efficiency. For example, a system on a chip (SoC) may include two power levels that define power budgets for the SoC, but fail to adequately define how the SoC should respond (e.g., processor core usage and frequency spread) to a power budget change.

Conventional solutions fail to adjust performance parameters when a device workload changes, relying on manual and/or static tuning (e.g., user adjusts a single slider to provide information to SoC). For example, a conventional system may be placed in a "best performance" mode and stay in the best performance mode despite a lessened workload. Moreover, users tend not to configure static tuning parameters even when available and, further still, tend not to re-configure such tuning parameters based on how the compute device is being used at a given time. Thus, many compute devices operate at only one tuning state for the device's lifetime. Some conventional solutions provide a single setting for tablets, thin-and-light laptops, and gaming PCs. Such solutions fail to change settings based on the types of workloads running on the system, the background activity of the system, and/or characteristics of the ambient environment.

In contrast to conventional solutions, examples disclosed herein improve computer efficiency by matching computer hardware configurations with SoC workload, user activities, user preferences, system configurations, and other parameters. Examples disclosed herein improve computer performance management and reduce energy waste by dynamically adjusting performance parameters in response to changing conditions associated with a device.

Examples disclosed herein may manage a power budget for a SoC. For example, if a workload is light and user activity is low, examples disclosed herein may request a SoC reduce performance of some cores of a multi-core processor and skew SoC power/performance management settings toward power efficiency. On the other hand, if a workload is heavy and the user activity is high, examples may skew towards higher power.

Some examples disclosed herein tune and/or dynamically reconfigure a SoC at runtime, without manual user tuning. In some examples, reconfiguration of the SoC is facilitated by a machine learning model that classifies user actions and system workload, sending reconfiguration instructions to the SoC. In some examples, the machine learning model is pre-trained and delivered via a software distribution system. Trained machine learning models can drive system behavior based on user workload classification and other characteristics. In some examples, inference is performed with a machine learning model that is updated by an equipment manufacturer (OEM) via device drivers.

Examples disclosed herein define a framework for OEMs to fine tune systems to satisfy energy regulation requirements without compromising responsiveness and/or a user experience. Examples track workload characteristics and change operating system and hardware settings to balance performance and power. Examples disclosed herein may be customized for various system types and provide differentiated user settings. Some examples are user-aware, detect a running workload, and predict user actions and effects of the user actions on the workload.

Turning to the figures, FIG. 1 is a block diagram of an example system 100 to manage energy usage and compute performance. The example system 100 of FIG. 1 may be instantiated (e.g., creating an instance of, bring into being for any length of time, materialize, implement, etc.) by processor circuitry such as a central processing unit executing instructions. Additionally or alternatively, the example system 100 of FIG. 1 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 1 may, thus, be instantiated at the same or different times. Some or all of the circuitry may be instantiated, for example, in one or more threads executing concurrently on hardware and/or in series on hardware. Moreover, in some examples, some or all of the circuitry of FIG. 1 may be implemented by one or more virtual machines and/or containers executing on the microprocessor.

The example system 100 includes example system information retrieval circuitry 102, example system power mode management circuitry 104, example parameter retrieval circuitry 106, example system optimizer circuitry 108, example hardware configurator circuitry 110, and an example bus 112.

The example system 100 dynamically adjusts performance parameters based on system conditions, SoC workload, and user activity classification. For example, when a user is actively working on a PC and increased performance is desired (e.g., scientific computation, graphics rendering), the example system 100 configures system parameters to increase system performance. If increased performance is not desired (e.g., web browsing or video playback), a lower performance state can be automatically applied, thereby conserving energy. The example system 100 includes customizable operating states based on user objectives, thermal budgets, and other operating constraints.

The example system 100 includes the example system information retrieval circuitry 102. The example system information retrieval circuitry 102 retrieves system and associated information and provides the information to the system power mode management circuitry 104. In some examples, the system information retrieval circuitry 102 retrieves first telemetry data associated with a compute device. The first telemetry data may include, for example, a battery charge state and a determination if the compute device is coupled to an alternating current source. For example, the system information retrieval circuitry 102 may retrieve system configuration data, a customer preference, information on an ambient environment, a usage scenario (e.g., associated with a PC, SoC, and/or another processor) and provide the retrieved information to the example system power mode management circuitry 104.

In some examples, the system 100 includes means for retrieving system configuration, customer preferences, ambient environment information, and usage scenarios. For example, the means for retrieving may be implemented by the example system information retrieval circuitry 102. In some examples, the system information retrieval circuitry 102 may be instantiated by processor circuitry such as the example processor circuitry 912 of FIG. 9. For instance, the system information retrieval circuitry 102 may be instantiated by the example general purpose processor circuitry 1000 of FIG. 10 executing machine executable instructions such as that implemented by at least block 402 of FIG. 4. In some examples, the system information retrieval circuitry 102 may be instantiated by hardware logic circuitry, which may be implemented by an ASIC or the FPGA circuitry 1100 of FIG. 11 structured to perform operations corresponding to the machine readable instructions. Additionally or alternatively, the system information retrieval circuitry 102 may be instantiated by any other combination of hardware, software, and/or firmware. For example, the system information retrieval circuitry 102 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example system power mode management circuitry 104 receives the retrieved information from the example system information retrieval circuitry 102 and uses the retrieved information to generate a system power mode classification. The system power mode management circuitry 104 may select a system power mode based on the first telemetry data associated with a compute device. For example, the system power mode may be generated by a rules based classification. In some examples, the system power mode is generated based on a machine learning model (e.g., an artificial neural network, a decision tree, a support vector machine, etc.). In some examples, the system power mode management circuitry selects a system power mode from a set of predefined power modes that consist of first, second, and third power modes, the first power mode to configure the compute device to consume less power than the second power mode, the second power mode to configure the compute device to consume less power than the third power mode.

In some examples, the system 100 includes means for selecting a system power mode based on first telemetry data associated with a compute device. For example, the means for selecting may be implemented by the example system power mode management circuitry 104. In some examples, the system power mode management circuitry 104 may be instantiated by processor circuitry such as the example processor circuitry 912 of FIG. 9. For instance, the system power mode management circuitry 104 may be instantiated by the example general purpose processor circuitry 1000 of FIG. 10 executing machine executable instructions such as that implemented by at least blocks 404 of FIG. 4. In some examples, the system power mode management circuitry 104 may be instantiated by hardware logic circuitry, which may be implemented by an ASIC or the FPGA circuitry 1100 of FIG. 11 structured to perform operations corresponding to the machine readable instructions. Additionally or alternatively, the system power mode management circuitry 104 may be instantiated by any other combination of hardware, software, and/or firmware. For example, the system power mode management circuitry 104 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate. In some examples, the means for selecting includes means for selecting a system power mode from a set of predefined power modes.

The example parameter retrieval circuitry 106 provides user activity data and second telemetry data associated with the compute device to the example system optimizer circuitry 108. The example parameter retrieval circuitry 106 retrieves user activities, SoC workload information, a user-defined configuration setting, a customer preference, and other parameters. Additionally, the example parameter retrieval circuitry 106 provides the second telemetry data to the system optimizer circuitry 108.

In some examples, the system 100 includes means for providing user activity data and second telemetry data associated with the compute device to a classification system. For example, the means for providing may be implemented by the example parameter retrieval circuitry 106. In some examples, the parameter retrieval circuitry 106 may be instantiated by processor circuitry such as the example processor circuitry 912 of FIG. 9. For instance, the parameter retrieval circuitry 106 may be instantiated by the example general purpose processor circuitry 1000 of FIG. 10 executing machine executable instructions such as that implemented by at least blocks 406 of FIG. 4. In some examples, the parameter retrieval circuitry 106 may be instantiated by hardware logic circuitry, which may be implemented by an ASIC or the FPGA circuitry 1100 of FIG. 11 structured to perform operations corresponding to the machine readable instructions. Additionally or alternatively, the parameter retrieval circuitry 106 may be instantiated by any other combination of hardware, software, and/or firmware. For example, the parameter retrieval circuitry 106 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The system optimizer circuitry 108 is a trained machine learning model that takes the system power mode state from the system power mode management circuitry 104 and generates a classification. The classification is associated with a plurality of parameters that are adjusted by the example hardware configurator 110. In some examples, the plurality of parameters are grouped together to meet an efficiency condition, and the plurality of parameters includes processor frequency, wireless communication enablement, graphics processor enablement, and secondary storage enablement.

In some examples, the system 100 includes means for classifying user activity data and second telemetry data associated with a compute device. For example, the means for classifying may be implemented by the example system optimizer circuitry 108. In some examples, the system optimizer circuitry 108 may be instantiated by processor circuitry such as the example processor circuitry 912 of FIG. 9. For instance, system optimizer circuitry 108 may be instantiated by the example general purpose processor circuitry 1000 of FIG. 10 executing machine executable instructions such as that implemented by at least blocks 410, 412, 414, 502, 504, 506, 602, 604, and 606 of FIGS. 4-6. In some examples, system optimizer circuitry 108 may be instantiated by hardware logic circuitry, which may be implemented by an ASIC or the FPGA circuitry 1100 of FIG. 11 structured to perform operations corresponding to the machine readable instructions. Additionally or alternatively, the system optimizer circuitry 108 may be instantiated by any other combination of hardware, software, and/or firmware. For example, the system optimizer circuitry 108 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

For example, a classification by the system optimizer circuitry 108 may be a first classification associated with a burst workload, and the hardware configurator circuitry 110 may configure a first plurality of parameters to increase power consumption by a compute device. Then, after the plurality of parameters is configured, in response to a change in a primary application associated with the burst workload, the hardware configurator circuitry 110 may configure a second plurality of parameters to reduce power consumption by the compute device.

In some examples, the system 100 includes means for configuring a plurality of parameters to manage power consumption and performance of the compute device based on a classification by the classification system. For example, the means for configuring may be implemented by the example hardware configurator circuitry 110. In some examples, the hardware configurator circuitry 110 may be instantiated by processor circuitry such as the example processor circuitry 912 of FIG. 9. For instance, the hardware configurator circuitry 110 may be instantiated by the example general purpose processor circuitry 1000 of FIG. 10 executing machine executable instructions such as that implemented by at least blocks 416, 418, 420, 508, 510, 512, 608, 610, and 612 of FIGS. 4-6. In some examples, hardware configurator circuitry 110 may be instantiated by hardware logic circuitry, which may be implemented by an ASIC or the FPGA circuitry 1100 of FIG. 11 structured to perform operations corresponding to the machine readable instructions. Additionally or alternatively, the hardware configurator circuitry 110 may be instantiated by any other combination of hardware, software, and/or firmware. For example, the hardware configurator circuitry 110 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate. In some examples, the means for configuring includes means for configuring the first plurality of parameters to increase power consumption by the compute device and means for configuring a second plurality of parameters to reduce power consumption by the compute device.

Figure 2:
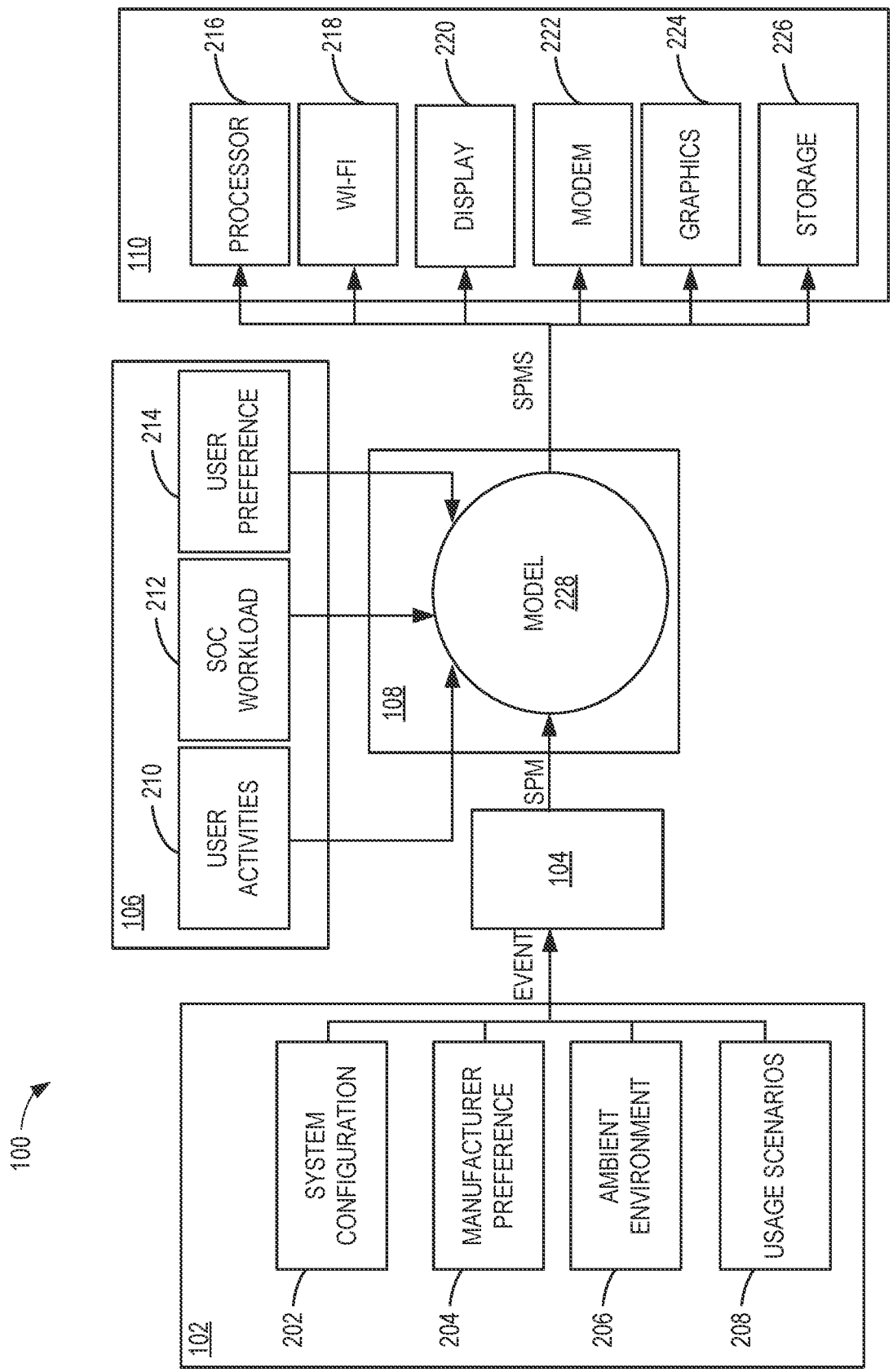
FIG. 2 is a block diagram of an example implementation of the example system 100 of FIG. 1.

FIG. 2 is a block diagram of an example implementation of the system 100 of FIG. 1 to manage energy usage and compute performance. The system 100 of FIGS. 1 and 2 may be instantiated (e.g., creating an instance of, bring into being for any length of time, materialize, implement, etc.) by processor circuitry such as a central processing unit executing instructions. Additionally or alternatively, the system 100 of FIGS. 1 and 2 may be instantiated (e.g., creating an instance of, bring into being for any length of time, materialize, implement, etc.) by an ASIC or an FPGA structured to perform operations corresponding to the instructions. It should be understood that some or all of the circuitry of FIGS. 1 and 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by one or more virtual machines and/or containers executing on the microprocessor.

The system 100 of FIG. 2 includes an example system configuration 202, an example manufacturer preference 204, an example ambient environment 206, example usage scenarios 208, example user activity information 210, an example SoC workload 212, an example user preference 214, an example model 228, an example processor 216, example wi-fi circuitry 218, an example display 220, an example modem 222, an example graphics card 224, and example storage 226.

The example system information retrieval circuitry 102 may retrieve system configuration information 202. The system configuration information 202 varies based upon hardware and software changes, while accounting for different system types and configurations. For example, some systems do not need to optimize for battery life (e.g., systems with a dedicated power source), and may be configured to achieve high performance per watt. Some examples may have different desired system configurations, and therefore different performance and/or battery life demands.

The example system information retrieval circuitry 102 may retrieve the manufacturer preferences 204. The example manufacturer preference 204 is an OEM customer preference. Each manufacturer designs a system based on specific performance objectives and configuration goals that are reflected in the manufacturer preferences 204. In some examples, the manufacturer preferences 204 is an end-user preference that is set by the user from a group of pre-determined preferences.

The example system information retrieval circuitry 102 may retrieve information related to the ambient environment 206. The ambient environment information 206 includes information about an ambient environment associated with a computing device. Example differences in ambient environments may include: (i) if a system is running on AC vs. DC power; (ii) if a user is in a noisy environment vs. a non-noisy environment; (iii) if the user is detected in front of the device vs. if the user is not in front of the device; etc.

The example system information retrieval circuitry 102 may additionally retrieve information related to the usage scenarios 208 associated with a compute device. The usage scenarios 208 may be associated with a specific program or workload. For example, a video-conference usage scenario may have different performance demands than a gaming scenario.

Based on the information from the system information retrieval circuitry 102, the system power mode management circuitry 104 determines a system power mode to provide to the system optimizer circuitry 108. The system power mode management circuitry 104 is a rule based manager that retrieves data from the system information retrieval circuitry 102 and outputs a power mode for the model 228. In some examples, the example system power mode management circuitry 104 may be based on a user interface element. For example, a user may select a power slider position from a group of three positions (e.g., power-saver, balanced, and performance). In some examples, a power slider position may be programmatically selected, or an application programming interface (API) endpoint may provide programmatic control of the power position. In some examples, the system power mode management circuitry 104 may be powered by a machine learning engine.

The example parameter retrieval circuitry 106 may retrieve the user activity information 210 to provide to the example system optimizer circuitry and the model 228. In some examples, the user activity information 210 information is provided to a SoC parameter machine learning model. In some examples, the SoC parameter model may analyze the SoC workload before providing information to the model 228 of the example system optimizer circuitry 108 about the state of the SoC. Some workloads are high performance workloads, while other workloads may be burst-style (e.g., periods of high performance separated by periods of lesser performance). Some workloads may be reduced-demand workloads (e.g., battery-friendly workload). A reduced-demand workload may be satisfied by relatively lower-performance system settings, and may be associated with longer battery life than high-performance and/or burst workloads.

The example parameter retrieval circuitry 106 also retrieves information on the user activities 210 and provides the user activity information 210 to the model 228. For example, a user may be typing, using a specific application, or switching applications. Additionally, the example parameter retrieval circuitry 106 also retrieves user preference information 214 and provides the user preference information 214 to the model 228 for classification. The user preference information 214 offers another way for a user to affect the system optimizer circuitry 108 and the model 228. The example user preference information 214 may include user-defined configuration settings. For example, a user may interact with a graphical user interface element or alter a configuration file to affect settings of a device.

The example system optimizer circuitry 108 retrieves the information from the system power mode management circuitry 104 and the parameter retrieval circuitry 106, generates a classification, and selects system configuration parameters. In some examples, the hardware configuration parameters are grouped into a system power mode setting (SPMS). Each SPMS configures elements of a compute device and optimizes the compute device for a workload.

The example hardware configurator circuitry 110 implements the SPMS in hardware. The implementation may be performed by adjusting device register values, executing instructions with processor circuitry, etc. For example, the processor 216 may have a CPU frequency adjustable based on an energy performance preference (EPP) value stored in a register in some Intel® processors. In some examples, the processor 216 may change operating frequency and voltage to improve performance and power efficiency, wherein the changes are associated with a specific EPP value. Wi-fi parameters 218 (e.g., enable/disable Wi-Fi, reduce network performance), display parameters 220 (e.g., brightness, resolution), the modem parameters 222, the graphics card 224, and the storage 226 may all be adjusted by the hardware configurator circuitry 110.

In other words, the hardware configurator circuitry 110 may adjust EPP parameters via hardware controlled performance states (HWP) or model specific registers (MSR) to dynamically control processor performance and manage energy/performance bias. In some examples, the hardware configurator circuitry 110 may dynamically bias operating system (OS) requests for processor idle sleep states (ACPI C-states) and adjust bias toward shallower/deeper idle states. In some examples the hardware configurator circuitry 110 may adjust OS hybrid thread scheduling via a registry/API to bias software thread scheduling towards performance cores and/or efficiency cores. In some examples, the hardware configurator circuitry may adjust an OS core parking setting to dynamically park/offline a configurable number of cores at run time.

While an example manner of implementing the system 100 of FIG. 1 is illustrated in FIG. 2, one or more of the elements, processes, and/or devices illustrated in FIG. 2 may be combined, divided, re-arranged, omitted, eliminated, and/or implemented in any other way. Further, the example system information retrieval circuitry 102, the example system power mode management circuitry 104, the example parameter retrieval circuitry 106, the example system optimizer circuitry 108, the example hardware configurator circuitry 110, the example bus 112 and/or, more generally, the example system 100 of FIGS. 1 and 2, may be implemented by hardware alone or by hardware in combination with software and/or firmware. Thus, for example, any of the example the example system information retrieval circuitry 102, the example system power mode management circuitry 104, the example parameter retrieval circuitry 106, the example system optimizer circuitry 108, the example hardware configurator circuitry 110, the example bus 112, and/or, more generally, the example system 100 of FIG. 1, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example system 100 of FIG. 1 may include one or more elements, processes, and/or devices in addition to, or instead of, those illustrated in FIG. 2, and/or may include more than one of any or all of the illustrated elements, processes and devices.

Figure 3:
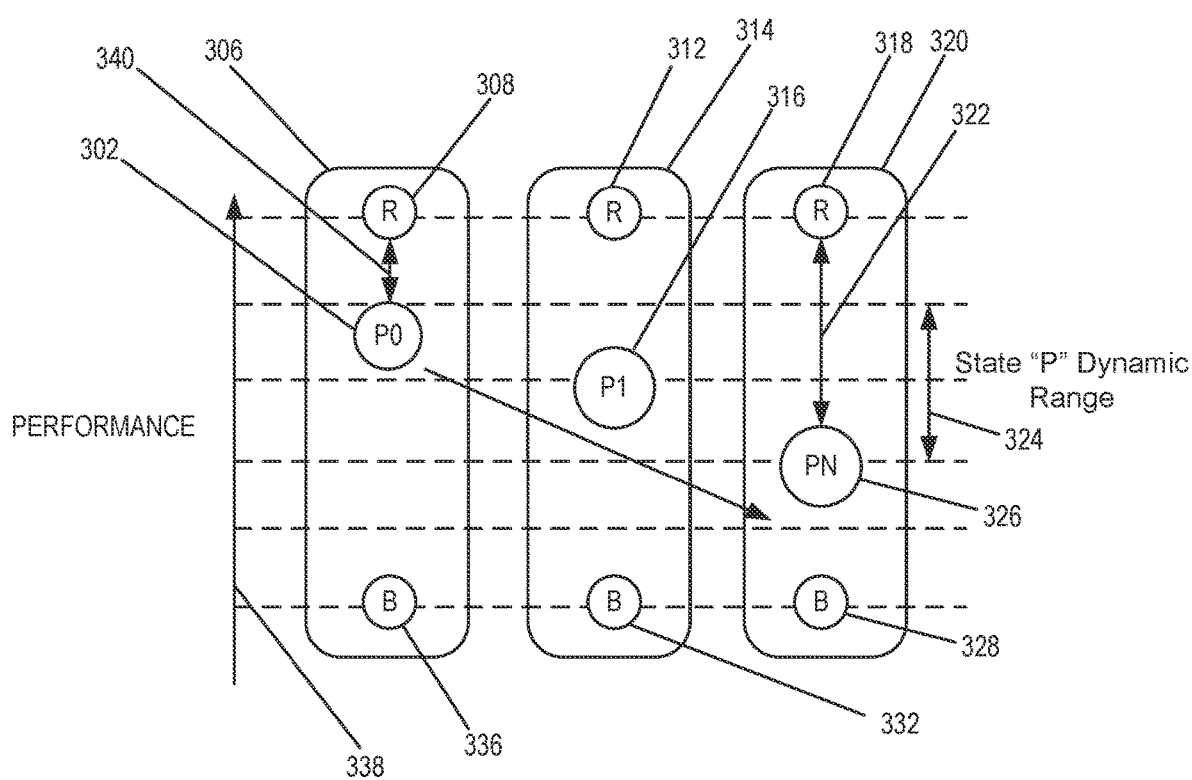
FIG. 3 is an illustration of performance and power tradeoffs associated with the example system 100 of FIG. 1.

FIG. 3 is a graph of performance and power tradeoffs associated with the example system 100 of FIG. 1. The graph of FIG. 3 includes an example first performance power state 302, an example second performance power state 316, an example third performance power state 326, an example first responsive power state 308, an example second responsive power state 312, an example third responsive power state 318, an example first battery power state 336, an example second battery power state 332, an example third battery power state 328, an example first performance preference 306, an example second performance preference 314, an example third performance preference 320, an example axis 338, an example first arrow 322, an example second arrow 324, and an example third arrow 340.

In FIG. 3, the axis 338 indicates performance (e.g., performance increases in direction of axis arrow). Each circle (e.g., first responsive power state 308, the second battery power state 332) in FIG. 3 represents a power state. The letters within each circle categorize each power state. "R" represents a high-performance power state (e.g., responsiveness state), "B" represents a low-performance power state (e.g., a battery life state), and "P" represents variable-performance power states. For example, P0, P1, and PN correspond to the many possible performance power states between "R" and "B", labeled in order of performance (e.g, P0 higher performance than P1, P1 higher performance than P2). In some examples, "R" and "B" states are static and represent lower and upper performance bounds, respectively. In contrast to "R" and "B" states, "P" states are dynamic and represent many different performance states. The dynamic nature of "P" states is shown by the example first and second arrows 322 and 324.

The example first performance preference 306, the example second performance preference 314, and the example third performance preference 320 are performance preferences that may be set by an end user or an OEM. Each performance preference includes many power states (e.g., the first performance preference 306 includes the first battery power state 308, the first performance power state 302, and the first battery power state 336). In FIG. 3, performance preferences increase in energy efficiency from left to right (e.g., the first performance preference 306 is tuned for performance, the third performance preference 320 is tuned for energy savings). For example, the first performance preference 306 may represent a "max performance" preference, the second performance preference 314 may represent a "balanced performance" preference, and the example third performance preference 320 may represent a "lower performance" preference. A comparison of the third arrow 340 to the first arrow 322 illustrates the performance gap between the first responsive power state 308 and the first performance power state 302 is greater than the gap between the third responsive power state 318 and the third performance power state 326. This is because the third performance preference 320 is more tuned towards energy savings than the first performance preference 306.

In some examples, transitions between performances states occur every few seconds (e.g., every 2 seconds, every 10 seconds, every 40 seconds). Some examples may set a threshold transition time period. For example, a lower threshold transition time period may be set at one second, so that each state is maintained for at least one second before transitioning out of the state. Setting such a threshold may avoid energy inefficient performance oscillations. On the other hand, long periods between transitions may be associated with failure to optimize for performance events (e.g., burst workloads). In some examples, the timing of transitions is managed by the system optimizer circuitry 108 at runtime.

For example, a device implementing the first performance preference 306 might stay in an first responsive power state 308 for as little time as possible (e.g., only a few seconds), as the first responsive power state 308 consumes more energy than the other power states associated with the first performance preference 306. Accordingly, to reduce energy consumption, the device would stay in the first battery power state 336 for as long as possible.

As another example, a device implementing the first performance preference 306 and experiencing a burst workload (e.g., spikes of activity, high foreground activity) would perform a first transition to the first responsive power state 308. In response to the first transition, the hardware configurator circuitry 110 of FIG. 1 would configure parameter settings for the device accordingly. After the first transition, responsive to a workload beyond a threshold value, the example system optimizer circuitry 108 of FIG. 1 may perform a second transition to a second power state associated with the threshold value.

Figure 4:
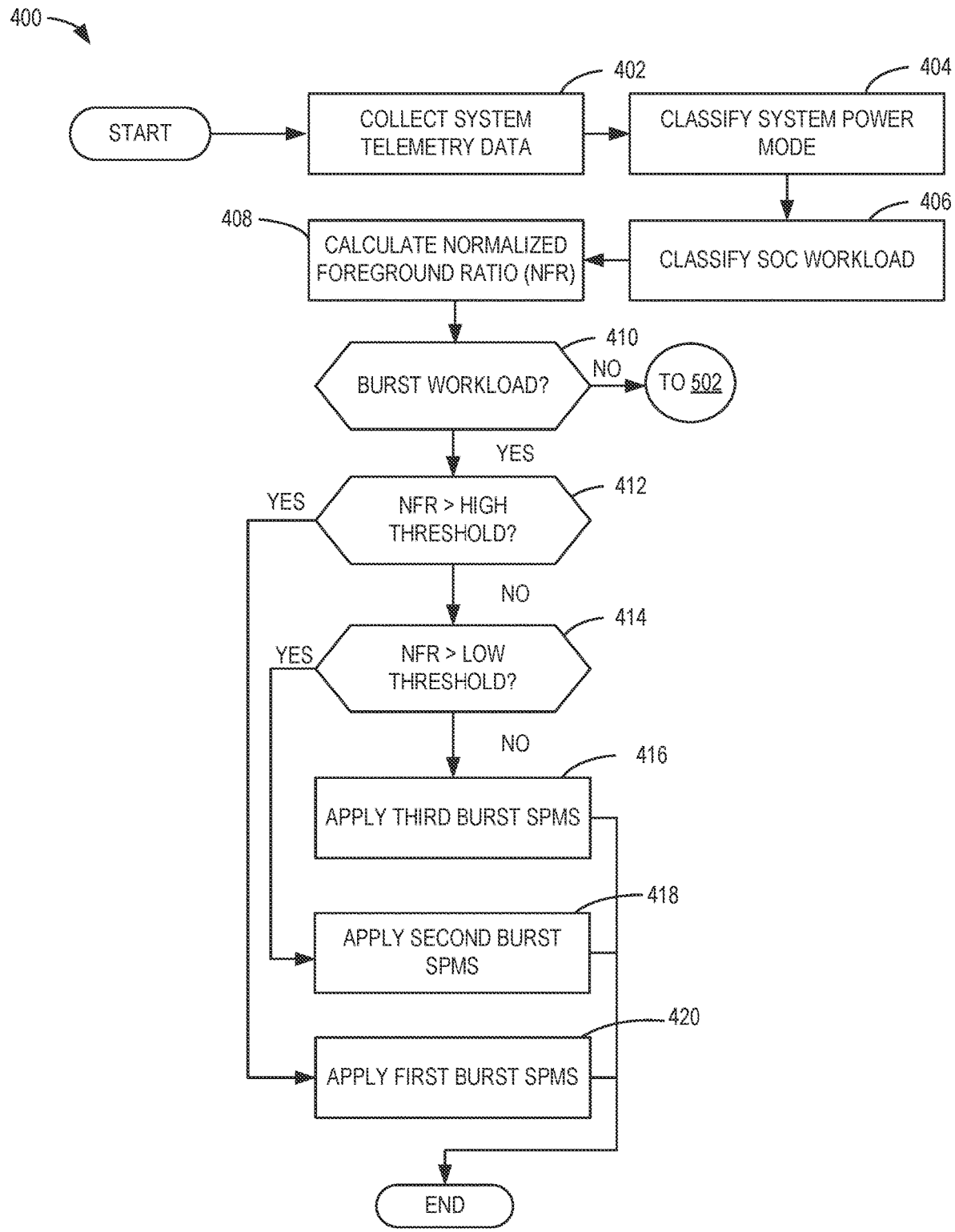
FIG. 4 is a flowchart representative of example machine readable instructions and/or example operations that may be executed by example processor circuitry to implement the example system 100 of FIG. 1.
Figure 5:
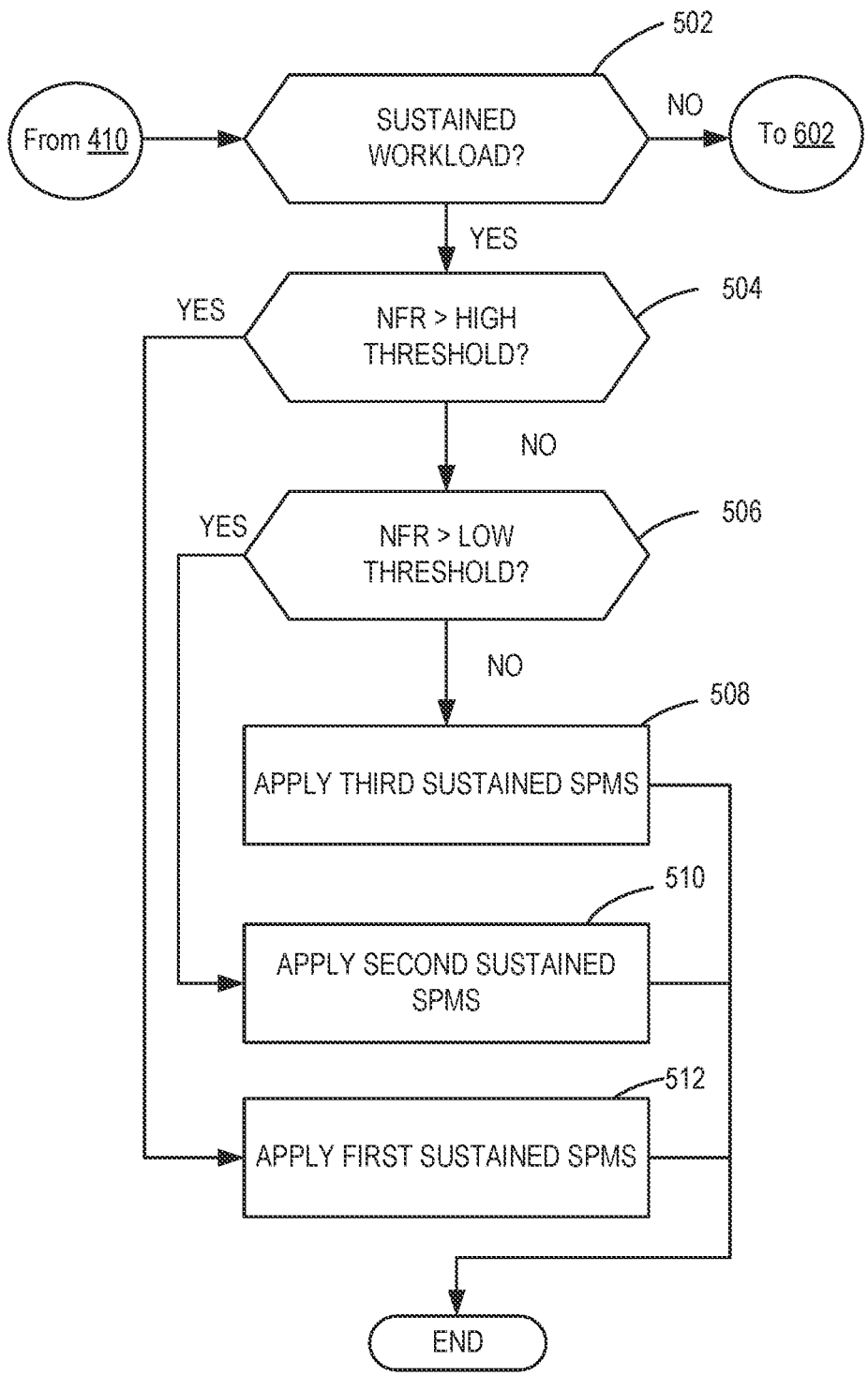
FIG. 5 is a flowchart representative of example machine readable instructions and/or example operations that may be executed by example processor circuitry to implement the example system 100 of FIG. 1 responsive to a sustained workload.
Figure 6:
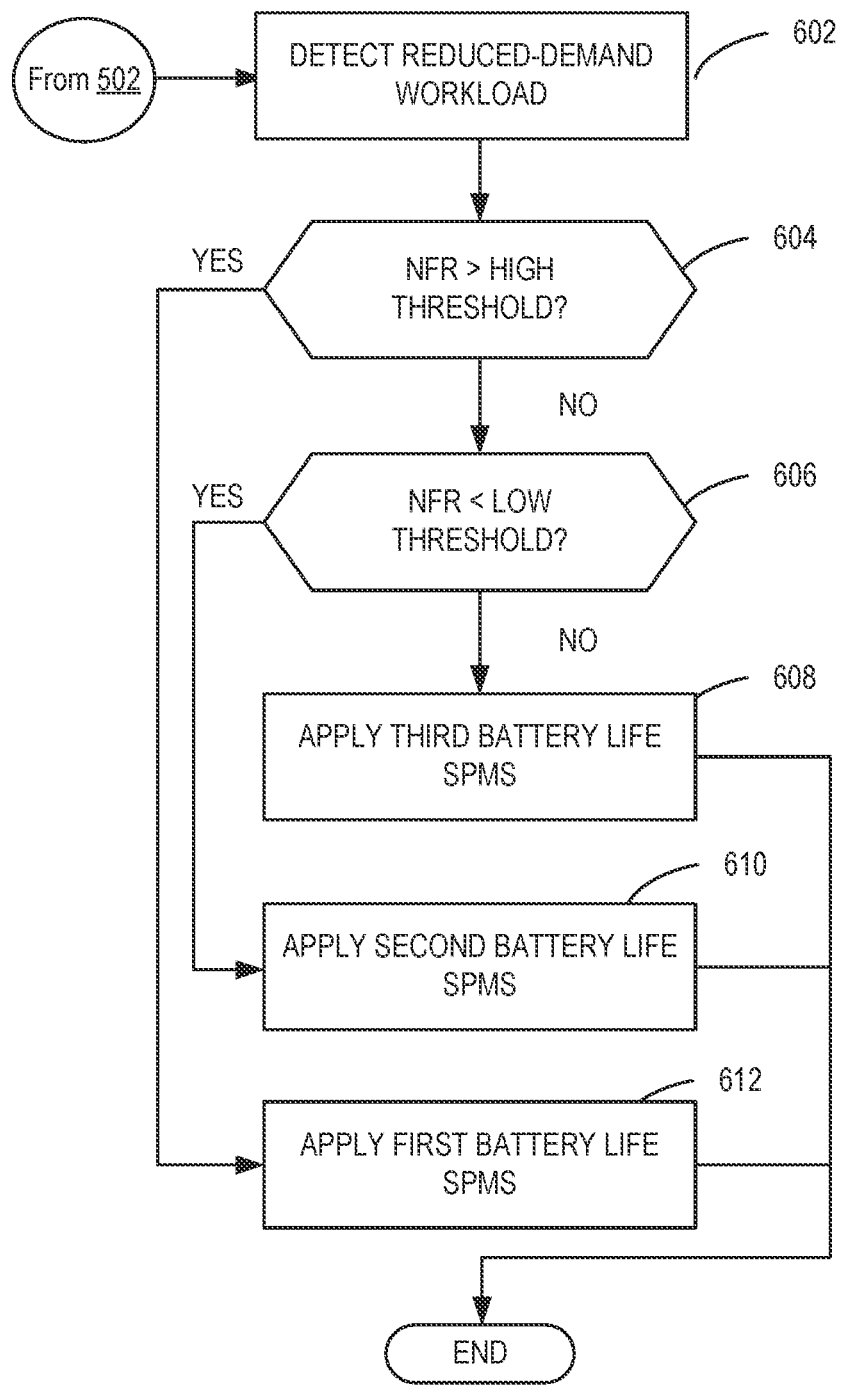
FIG. 6 is a flowchart representative of example machine readable instructions and/or example operations that may be executed by example processor circuitry to implement the example system 100 of FIG. 1 responsive to a reduced-demand workload.

A flowchart representative of example hardware logic circuitry, machine readable instructions, hardware implemented state machines, and/or any combination thereof for implementing the example system 100 of FIGS. 1 and 2 is shown in FIGS. 4-6. The machine readable instructions may be one or more executable programs or portion(s) of an executable program for execution by processor circuitry, such as the processor circuitry 912 shown in the example processor platform 900 discussed below in connection with FIG. 9 and/or the example processor circuitry discussed below in connection with FIGS. 10 and/or 11. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices.

Further, although the example program is described with reference to the flowchart illustrated in FIGS. 4-6, many other methods of implementing the example system 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 4-6 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIGS. 4-6, when considered together, provide one example instantiation of the example system 100 of FIGS. 1 and 2. In general, the figures describe a process wherein data is collected for classification, a workload is classified, a normalized foreground ratio (NFR) is calculated, an appropriate SPMS is determined, and a device is configured based on the SPMS.

In FIGS. 4-6, there are two NFR threshold types (high threshold and low threshold). Each high threshold is a greater than a corresponding low threshold for the same workload. Specific NFR threshold values may be determined based on tuning with pre-defined workloads on specific platforms and/or other benchmarking procedures.

The example of FIGS. 4-6 includes 3 SPMS settings for each workload type. However, some examples may include additional SPMS settings and associated threshold values. In some examples, rules and settings for each SoC workload type are specified in a configuration file, with content organized in groups identified by system telemetry software/hardware. Thus, the configuration file can have different settings and rules for different platforms in a single file.

FIG. 4 is a flowchart representative of example machine readable instructions and/or example operations 400 that may be executed and/or instantiated by processor circuitry to manage energy usage and compute performance. The machine readable instructions and/or the operations 400 of FIG. 4 begin at block 402, at which the system information retrieval circuitry 102 of FIG. 1 collects system telemetry data. For example, the system information retrieval circuitry 102 of FIG. 1 may retrieve system configuration information, manufacturer preferences, information on the ambient environment, and usage scenarios and provide the information to the system power mode management circuitry 104 of FIG. 1 for classification.

At block 404, the example system power mode management circuitry 104 of FIG. 1 classifies a system power mode. The system power mode management circuitry 104 of FIG. 1 is a rule based manager that retrieves data from the system information retrieval circuitry 102 of FIG. 1 and generates a power mode selection for the system optimizer circuitry 108 of FIG. 1. In some examples, rather than a rule based manager, the system power mode management circuitry 104 of FIG. 1 may be associated with a trained machine learning model with inference performed at block 404.

At block 406, the example system optimizer circuitry 108 of FIG. 1 classifies a system workload. Some example workloads include a burst workload and a sustained workload. The example system optimizer circuitry 108 of FIG. 1 is a rule based manager that provides input to the system optimizer circuitry 108 of FIG. 1. In some examples, rather than a rule based manager, the system optimizer circuitry 108 of FIG. 1 may be associated with a trained machine learning model with inference performed at block 406.

At block 408 the system optimizer circuitry 108 of FIG. 1 calculates a NFR. In some examples, a NFR is a foreground application utilization ratio that is normalized to a single core. Some example systems may have 10 cores, 20 cores, 50 cores, etc.

In blocks 410-420, optimization of hardware parameters is performed based on workload type and NFR. In block 412 of FIG. 4, block 414 of FIG. 4, block 504 of FIG. 5, block 505 of FIG. 5, block 604 of FIG. 6, and block 605 of FIG. 6, each specific threshold may be determined by an OEM (e.g., by experimentation) and associated with a specific workload. Furthermore each of the thresholds in FIGS. 4-6 may be different threshold values.

At block 410, the system optimizer circuitry 108 of FIG. 1 determines if a burst workload is present. For example, a burst-style workload may be associated with periods of high performance separated by periods of lesser performance. Such information may be provided to the system optimizer circuitry 108 of FIG. 1 via hardware hooks, APIs, the system information retrieval circuitry 102 of FIG. 1, and/or the example parameter retrieval circuitry 106 of FIG. 1. If a burst workload is detected, control moves to block 412 where the system optimizer circuitry 108 of FIG. 1 compares a NFR to a first threshold value. Otherwise, control moves to block 502 of FIG. 5.

If, at block 412, the example system optimizer circuitry 108 of FIG. 1 determines the NFR is greater than a high threshold value, control moves to block 420 and a first burst SPMS is selected. For example, the first burst SPMS may configure hardware to increase processor frequency more than either the second burst SPMS and the third burst SPMS.

At block 412, if the example system optimizer circuitry 108 of FIG. 1 determines the NFR is less than the high threshold, control moves to block 414 where the NFR is compared to a low threshold. If the example system optimizer circuitry 108 of FIG. 1 determines the NFR is greater than the low threshold, the hardware configurator circuitry 110 of FIG. 1 applies the second burst SPMS at block 418. For example, the hardware configurator circuitry 110 of FIG. 1 may apply the second burst SPMS to tune a processor to a frequency less than a processor frequency associated with the first burst SPMS threshold, but greater than a processor frequency associated with the third burst SPMS threshold.

If, at block 414, the example system optimizer circuitry 108 of FIG. 1 determines the NFR is less than the low threshold, the example hardware configurator circuitry 110 of FIG. 1 may apply the third burst SPMS at block 418. For example, the third burst SPMS may be associated with a processor frequency lower than either the first burst SPMS and the second burst SPMS.

FIG. 5 continues the operations 400. At block 502, the system optimizer circuitry 108 of FIG. 1 determines if a sustained workload is present. For example, a sustained style workload may be associated with long periods of moderate performance. Such information may be provided to the system optimizer circuitry 108 of FIG. 1 via hardware hooks, APIs, the system information retrieval circuitry 102 of FIG. 1, and/or the example parameter retrieval circuitry 106 of FIG. 1. If a sustained workload is detected, control moves to block 504 where the system optimizer circuitry 108 of FIG. 1 compares a NFR to a first threshold value. Otherwise, control moves to block 602 of FIG. 6.

If, at block 504, the example system optimizer circuitry 108 of FIG. 1 determines the NFR is greater than a high threshold value, control moves to block 512 and a first sustained SPMS is selected. For example, the first sustained SPMS may configure hardware to decrease processor frequency less than either the second sustained SPMS and the third sustained SPMS.

At block 504, the example system optimizer circuitry 108 of FIG. 1 determines the NFR is less than the high threshold, control moves to block 506 where the NFR is compared to a low threshold. If the example system optimizer circuitry 108 of FIG. 1 determines the NFR is greater than the low threshold, the hardware configurator circuitry 110 of FIG. 1 applies the second sustained SPMS at block 510. For example, the hardware configurator circuitry 110 of FIG. 1 may apply the second sustained SPMS to tune a processor to a frequency less than a processor frequency associated with the first sustained SPMS threshold, but greater than a processor frequency associated with the third sustained SPMS threshold.

If, at block 506, the example system optimizer circuitry 108 of FIG. 1 determines the NFR is less than the low threshold, the example hardware configurator circuitry 110 of FIG. 1 may apply the third sustained SPMS at block 508. For example, the third sustained SPMS may be associated with a processor frequency less than either the first sustained SPMS and the second sustained SPMS.

FIG. 6 continues the operations 400. At block 602, the system optimizer circuitry 108 of FIG. 1 determines a reduced-demand workload is present. For example, a reduced-demand workload may be associated with long periods of low performance. Such information may be provided to the system optimizer circuitry 108 of FIG. 1 via hardware hooks, APIs, the system information retrieval circuitry 102 of FIG. 1, and/or the example parameter retrieval circuitry 106 of FIG. 1.

At block 604, the example system optimizer circuitry 108 of FIG. 1 determines the NFR is greater than a high threshold value, control moves to block 612 and a first battery life SPMS is selected. For example, the first battery life SPMS may configure hardware to decrease processor frequency less than either the second battery life SPMS and the third battery life SPMS.

At block 604, if the example system optimizer circuitry 108 of FIG. 1 determines the NFR is less than the high threshold, control moves to block 606 where the NFR is compared to a low threshold. If the example system optimizer circuitry 108 of FIG. 1 determines the NFR is greater than the low threshold, the hardware configurator circuitry 110 of FIG. 1 applies the second battery life SPMS at block 610. For example, the hardware configurator circuitry 110 of FIG. 1 may apply the second battery life SPMS to tune a processor to a frequency less than a processor frequency associated with the first battery life SPMS threshold, but greater than a processor frequency associated with the third battery life SPMS threshold.

If, at block 606, the example system optimizer circuitry 108 of FIG. 1 determines the NFR is less than the low threshold, the example hardware configurator circuitry 110 of FIG. 1 may apply the third battery life SPMS at block 608. For example, the third battery life SPMS may be associated with a processor frequency less than either the first battery life SPMS and the second battery life SPMS.

Figures 7A, 7B:
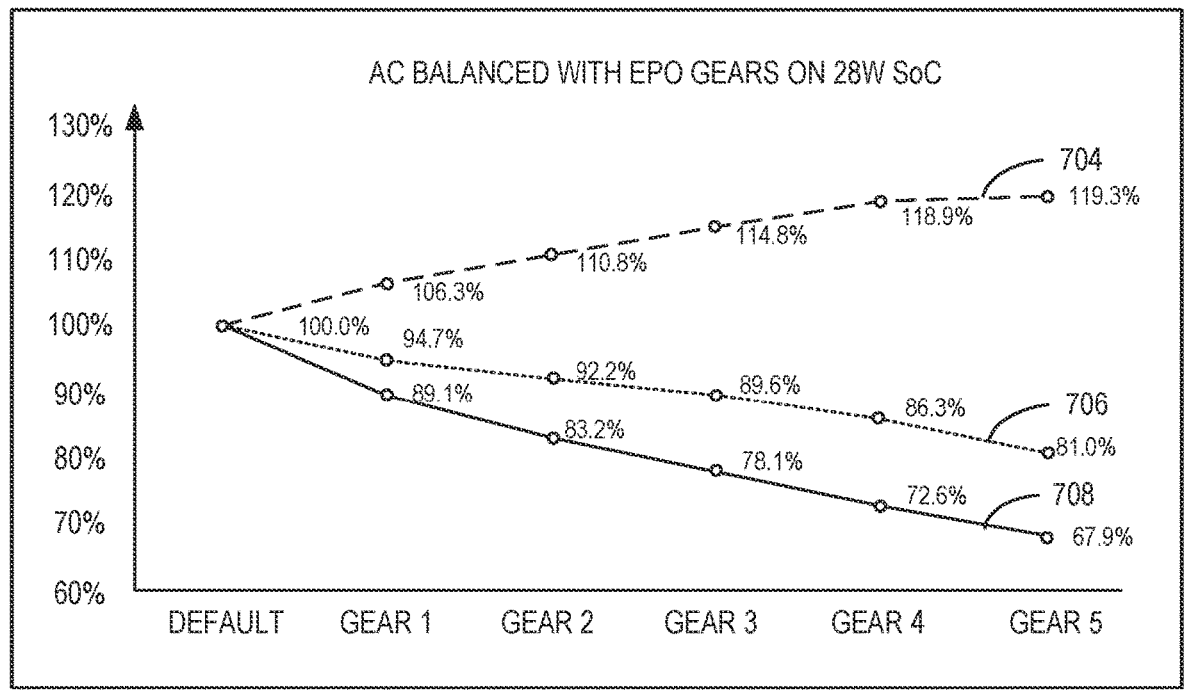
FIG. 7A is a table of example results including example performance per watt improvements of the example system 100 of FIG. 1 in operation.
FIG. 7B is a graph of example performance results of the example system 100 of FIG. 1.

FIG. 7A illustrates example performance improvements associated with the techniques disclosed herein. FIG. 7A includes a first table 700. The columns of the first table 700 are organized by gears. Gears are sets of additional performance parameters that help determine how a machine adapts to a workload. For example, systems operating in gears configured for higher performance will more often operate in higher performance power states.

The first table 700 illustrates five different gears. In general, changes between gears are less frequent than changes between performance states. In some examples, an OEM can dynamically switch between gears. For example, an OEM may select a specific gear based on a machine learning model.

FIG. 7B is an illustration of performance of a system that implements the techniques disclosed herein. FIG. 7B includes the graph 702, illustrating data measured on the system with an example "better" power setting at twenty-eight watts. The graph 702 includes a first line 704, a second line 706, and a third line 708. The first line 704 indicates a performance per watt improvement as a percentage value. The second line 706 indicates a performance percentage. The third line indicates a power percentage.

FIG. 8 is another illustration of example performance improvements associated with the techniques disclosed herein. FIG. 8 includes the first table 802 and the second table 804 with data showing up to a 2× performance/watt improvement achieved using the techniques described herein.

The table 802 presents performance data captured on a system executing videoconferencing software. In the table 802, for example, gear 5.5 shows a shows a 25% reduction in power when compared to a static EPP of 33 for a 3×3 videoconference call. Although the tables 802 and 804 show performance improvements associated with a video collaboration workload, improvements are not in any way limited to a videoconferencing workload.

Figure 9:
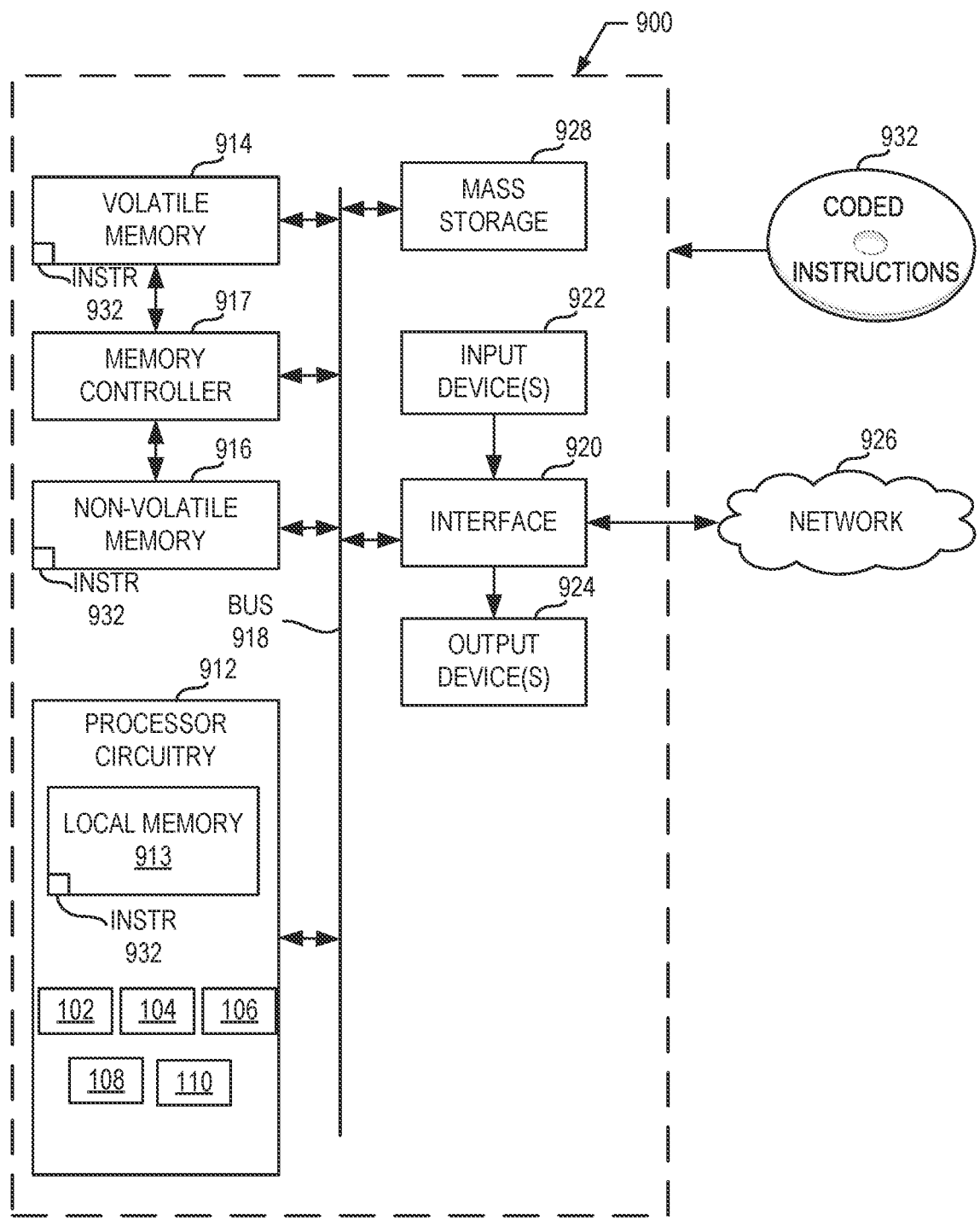
FIG. 9 is a block diagram of an example processing platform including processor circuitry structured to execute the example machine readable instructions and/or the example operations of FIGS. 4-6 to implement the system 100 of FIG. 1.

FIG. 9 is a block diagram of an example processor platform 900 structured to execute and/or instantiate the machine readable instructions and/or the operations of FIGS. 4-6 to implement the system 100 of FIGS. 1 and 2. The processor platform 900 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 900 of the illustrated example includes processor circuitry 912. The processor circuitry 912 of the illustrated example is hardware. For example, the processor circuitry 912 can be implemented by one or more integrated circuits, logic circuits, FPGAs, microprocessors, CPUs, GPUs, DSPs, and/or microcontrollers from any desired family or manufacturer. The processor circuitry 912 may be implemented by one or more semiconductor based (e.g., silicon based) devices. In this example, the processor circuitry 912 implements example system information retrieval circuitry 102, example system power mode management circuitry 104, example parameter retrieval circuitry 106, example system optimizer circuitry 108, example hardware configurator circuitry 110

The processor circuitry 912 of the illustrated example includes a local memory 913 (e.g., a cache, registers, etc.). The processor circuitry 912 of the illustrated example is in communication with a main memory including a volatile memory 914 and a non-volatile memory 916 by a bus 918. The volatile memory 914 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 916 may be implemented by flash memory and/or any other desired type of memory device. Access to the main memory 914, 916 of the illustrated example is controlled by a memory controller 917.

The processor platform 900 of the illustrated example also includes interface circuitry 920. The interface circuitry 920 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 922 are connected to the interface circuitry 920. The input device(s) 922 permit(s) a user to enter data and/or commands into the processor circuitry 912. The input device(s) 922 can be implemented by, for example, an audio sensor, a microphone, a camera (still or video), a keyboard, a button, a mouse, a touchscreen, a track-pad, a trackball, an isopoint device, and/or a voice recognition system.

One or more output devices 924 are also connected to the interface circuitry 920 of the illustrated example. The output device(s) 924 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 920 of the illustrated example, thus, typically includes a graphics driver card, a graphics driver chip, and/or graphics processor circuitry such as a GPU.

The interface circuitry 920 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 926. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 900 of the illustrated example also includes one or more mass storage devices 928 to store software and/or data. Examples of such mass storage devices 928 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 932, which may be implemented by the machine readable instructions of FIGS. 4-6, may be stored in the mass storage device 928, in the volatile memory 914, in the non-volatile memory 916, and/or on a removable non-transitory computer readable storage medium such as a CD or DVD.

Figure 10:
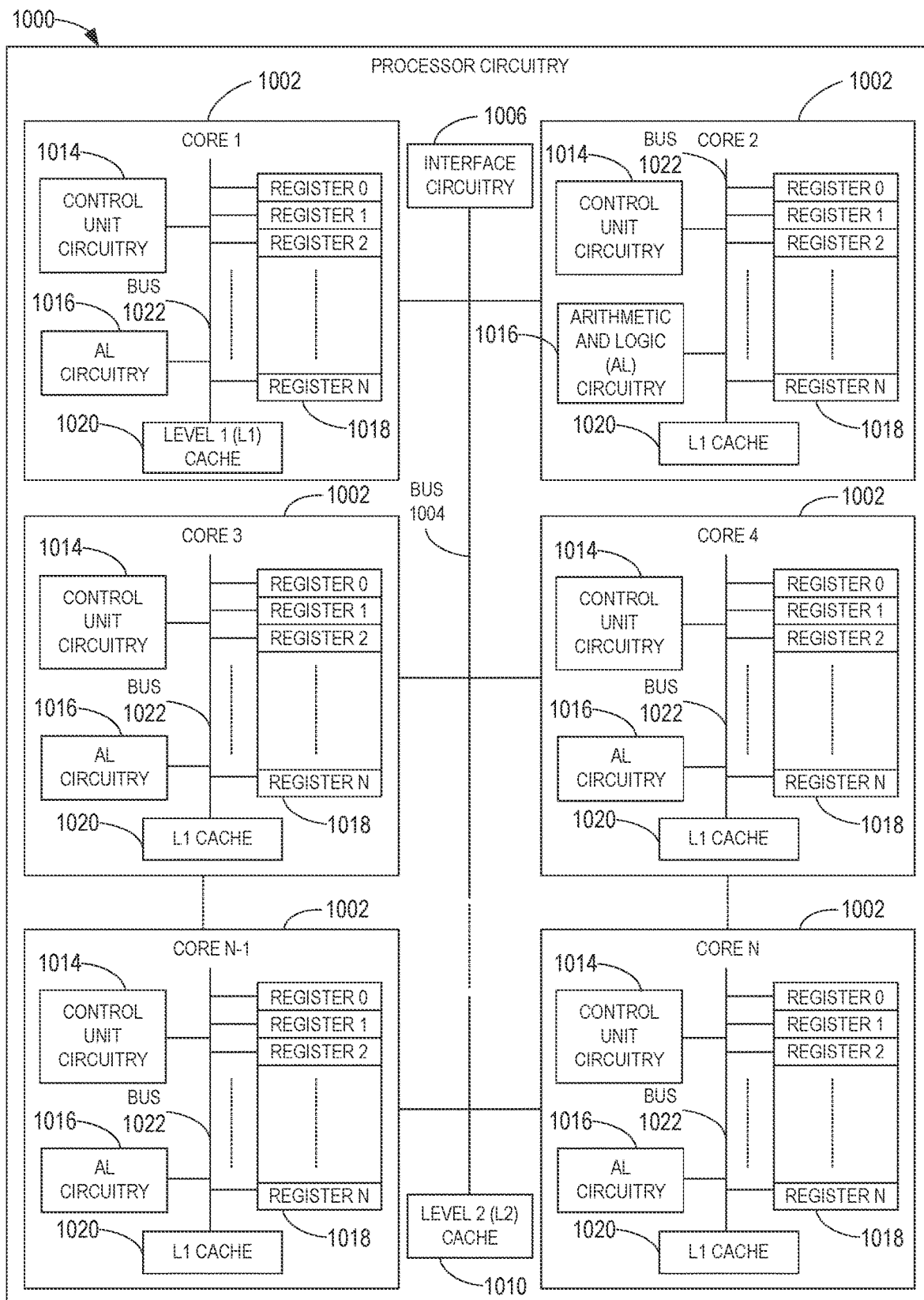
FIG. 10 is a block diagram of an example implementation of the processor circuitry of FIG. 9.

FIG. 10 is a block diagram of an example implementation of the processor circuitry 912 of FIG. 9. In this example, the processor circuitry 912 of FIG. 9 is implemented by a general purpose microprocessor 1000. The general purpose microprocessor circuitry 1000 executes some or all of the machine readable instructions of the flowchart of FIGS. 4-6 to effectively instantiate the circuitry of FIGS. 1-2 as logic circuits to perform the operations corresponding to those machine readable instructions. In some such examples, the circuitry of FIGS. 1-2 is instantiated by the hardware circuits of the microprocessor 1000 in combination with the instructions. For example, the microprocessor 1000 may implement multi-core hardware circuitry such as a CPU, a DSP, a GPU, an XPU, etc. Although it may include any number of example cores 1002 (e.g., 1 core), the microprocessor 1000 of this example is a multi-core semiconductor device including N cores. The cores 1002 of the microprocessor 1000 may operate independently or may cooperate to execute machine readable instructions. For example, machine code corresponding to a firmware program, an embedded software program, or a software program may be executed by one of the cores 1002 or may be executed by multiple ones of the cores 1002 at the same or different times. In some examples, the machine code corresponding to the firmware program, the embedded software program, or the software program is split into threads and executed in parallel by two or more of the cores 1002. The software program may correspond to a portion or all of the machine readable instructions and/or operations represented by the flowchart of FIGS. 4-6.

The cores 1002 may communicate by a first example bus 1004. In some examples, the first bus 1004 may implement a communication bus to effectuate communication associated with one(s) of the cores 1002. For example, the first bus 1004 may implement at least one of an Inter-Integrated Circuit (I2C) bus, a Serial Peripheral Interface (SPI) bus, a PCI bus, or a PCIe bus. Additionally or alternatively, the first bus 1004 may implement any other type of computing or electrical bus. The cores 1002 may obtain data, instructions, and/or signals from one or more external devices by example interface circuitry 1006. The cores 1002 may output data, instructions, and/or signals to the one or more external devices by the interface circuitry 1006. Although the cores 1002 of this example include example local memory 1020 (e.g., Level 1 (L1) cache that may be split into an L1 data cache and an L1 instruction cache), the microprocessor 1000 also includes example shared memory 1010 that may be shared by the cores (e.g., Level 2 (L2_cache)) for high-speed access to data and/or instructions. Data and/or instructions may be transferred (e.g., shared) by writing to and/or reading from the shared memory 1010. The local memory 1020 of each of the cores 1002 and the shared memory 1010 may be part of a hierarchy of storage devices including multiple levels of cache memory and the main memory (e.g., the main memory 914, 916 of FIG. 9). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1002 may be referred to as a CPU, DSP, GPU, etc., or any other type of hardware circuitry. Each core 1002 includes control unit circuitry 1014, arithmetic and logic (AL) circuitry (sometimes referred to as an ALU) 1016, a plurality of registers 1018, the L1 cache 1020, and a second example bus 1022. Other structures may be present. For example, each core 1002 may include vector unit circuitry, single instruction multiple data (SIMD) unit circuitry, load/store unit (LSU) circuitry, branch/jump unit circuitry, floating-point unit (FPU) circuitry, etc. The control unit circuitry 1014 includes semiconductor-based circuits structured to control (e.g., coordinate) data movement within the corresponding core 1002. The AL circuitry 1016 includes semiconductor-based circuits structured to perform one or more mathematic and/or logic operations on the data within the corresponding core 1002. The AL circuitry 1016 of some examples performs integer based operations. In other examples, the AL circuitry 1016 also performs floating point operations. In yet other examples, the AL circuitry 1016 may include first AL circuitry that performs integer based operations and second AL circuitry that performs floating point operations. In some examples, the AL circuitry 1016 may be referred to as an Arithmetic Logic Unit (ALU). The registers 1018 are semiconductor-based structures to store data and/or instructions such as results of one or more of the operations performed by the AL circuitry 1016 of the corresponding core 1002. For example, the registers 1018 may include vector register(s), SIMD register(s), general purpose register(s), flag register(s), segment register(s), machine specific register(s), instruction pointer register(s), control register(s), debug register(s), memory management register(s), machine check register(s), etc. The registers 1018 may be arranged in a bank as shown in FIG. 10. Alternatively, the registers 1018 may be organized in any other arrangement, format, or structure including distributed throughout the core 1002 to shorten access time. The second bus 1022 may implement at least one of an I2C bus, a SPI bus, a PCI bus, or a PCIe bus Each core 1002 and/or, more generally, the microprocessor 1000 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1000 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 11:
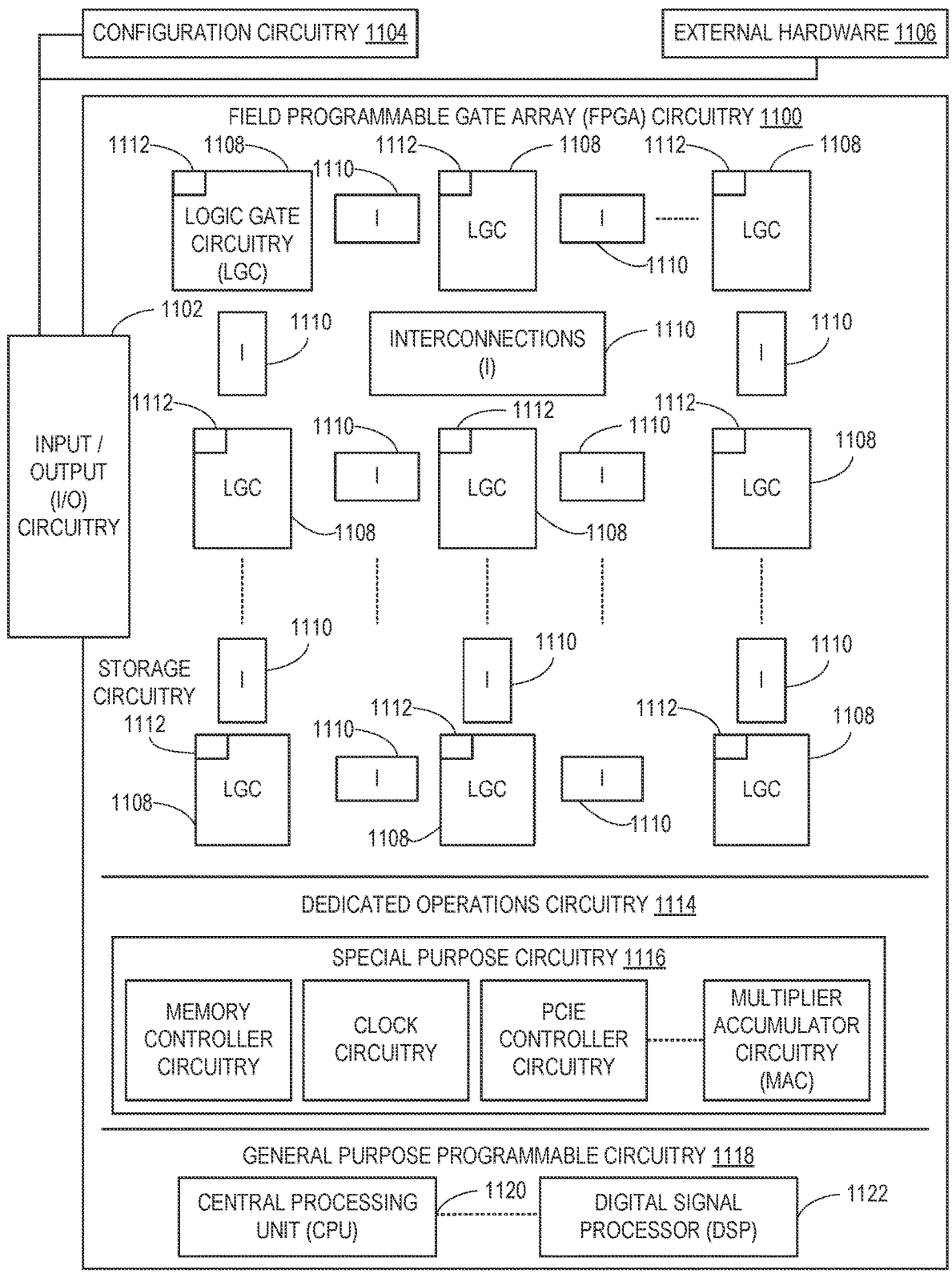
FIG. 11 is a block diagram of another example implementation of the processor circuitry of FIG. 9.

FIG. 11 is a block diagram of another example implementation of the processor circuitry 912 of FIG. 9. In this example, the processor circuitry 912 is implemented by FPGA circuitry 1100. The FPGA circuitry 1100 can be used, for example, to perform operations that could otherwise be performed by the example microprocessor 1000 of FIG. 10 executing corresponding machine readable instructions. However, once configured, the FPGA circuitry 1100 instantiates the machine readable instructions in hardware and, thus, can often execute the operations faster than they could be performed by a general purpose microprocessor executing the corresponding software.

More specifically, in contrast to the microprocessor 1000 of FIG. 10 described above (which is a general purpose device that may be programmed to execute some or all of the machine readable instructions represented by the flowchart of FIGS. 4-6 but whose interconnections and logic circuitry are fixed once fabricated), the FPGA circuitry 1100 of the example of FIG. 11 includes interconnections and logic circuitry that may be configured and/or interconnected in different ways after fabrication to instantiate, for example, some or all of the machine readable instructions represented by the flowchart of FIGS. 4-6. In particular, the FPGA 1100 may be thought of as an array of logic gates, interconnections, and switches. The switches can be programmed to change how the logic gates are interconnected by the interconnections, effectively forming one or more dedicated logic circuits (unless and until the FPGA circuitry 1100 is reprogrammed). The configured logic circuits enable the logic gates to cooperate in different ways to perform different operations on data received by input circuitry. Those operations may correspond to some or all of the software represented by the flowchart of FIGS. 4-6. As such, the FPGA circuitry 1100 may be structured to effectively instantiate some or all of the machine readable instructions of the flowchart of FIGS. 4-6 as dedicated logic circuits to perform the operations corresponding to those software instructions in a dedicated manner analogous to an ASIC. Therefore, the FPGA circuitry 1100 may perform the operations corresponding to the some or all of the machine readable instructions of FIGS. 4-6 faster than the general purpose microprocessor can execute the same.

In the example of FIG. 11, the FPGA circuitry 1100 is structured to be programmed (and/or reprogrammed one or more times) by an end user by a hardware description language (HDL) such as Verilog. The FPGA circuitry 1100 of FIG. 11, includes example input/output (I/O) circuitry 1102 to obtain and/or output data to/from example configuration circuitry 1104 and/or external hardware (e.g., external hardware circuitry) 1106. For example, the configuration circuitry 1104 may implement interface circuitry that may obtain machine readable instructions to configure the FPGA circuitry 1100, or portion(s) thereof. In some such examples, the configuration circuitry 1104 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1106 may implement the microprocessor 1000 of FIG. 10. The FPGA circuitry 1100 also includes an array of example logic gate circuitry 1108, a plurality of example configurable interconnections 1110, and example storage circuitry 1112. The logic gate circuitry 1108 and interconnections 1110 are configurable to instantiate one or more operations that may correspond to at least some of the machine readable instructions of FIGS. 4-6 and/or other desired operations. The logic gate circuitry 1108 shown in FIG. 11 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1108 to enable configuration of the electrical structures and/or the logic gates to form circuits to perform desired operations. The logic gate circuitry 1108 may include other electrical structures such as look-up tables (LUTs), registers (e.g., flip-flops or latches), multiplexers, etc.

The interconnections 1110 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1108 to program desired logic circuits.

The storage circuitry 1112 of the illustrated example is structured to store result(s) of the one or more of the operations performed by corresponding logic gates. The storage circuitry 1112 may be implemented by registers or the like. In the illustrated example, the storage circuitry 1112 is distributed amongst the logic gate circuitry 1108 to facilitate access and increase execution speed.

The example FPGA circuitry 1100 of FIG. 11 also includes example Dedicated Operations Circuitry 1114. In this example, the Dedicated Operations Circuitry 1114 includes special purpose circuitry 1116 that may be invoked to implement commonly used functions to avoid the need to program those functions in the field. Examples of such special purpose circuitry 1116 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1100 may also include example general purpose programmable circuitry 1118 such as an example CPU 1120 and/or an example DSP 1122. Other general purpose programmable circuitry 1118 may additionally or alternatively be present such as a GPU, an XPU, etc., that can be programmed to perform other operations.

Although FIGS. 10 and 11 illustrate two example implementations of the processor circuitry 912 of FIG. 9, many other approaches are contemplated. For example, as mentioned above, modern FPGA circuitry may include an on-board CPU, such as one or more of the example CPU 1120 of FIG. 11. Therefore, the processor circuitry 912 of FIG. 9 may additionally be implemented by combining the example microprocessor 1000 of FIG. 10 and the example FPGA circuitry 1100 of FIG. 11. In some such hybrid examples, a first portion of the machine readable instructions represented by the flowcharts of FIGS. 4-6 may be executed by one or more of the cores 1002 of FIG. 10, a second portion of the machine readable instructions represented by the flowcharts of FIGS. 4-6 may be executed by the FPGA circuitry 1100 of FIG. 11, and/or a third portion of the machine readable instructions represented by the flowcharts of FIGS. 4-6 may be executed by an ASIC. It should be understood that some or all of the circuitry of FIGS. 1-2 may, thus, be instantiated at the same or different times. Some or all of the circuitry may be instantiated, for example, in one or more threads executing concurrently and/or in series. Moreover, in some examples, some or all of the circuitry of FIGS. 1-2 may be implemented within one or more virtual machines and/or containers executing on the microprocessor.

In some examples, the processor circuitry 912 of FIG. 9 may be in one or more packages. For example, the processor circuitry 1000 of FIG. 10 and/or the FPGA circuitry 1100 of FIG. 11 may be in one or more packages. In some examples, an XPU may be implemented by the processor circuitry 912 of FIG. 9, which may be in one or more packages. For example, the XPU may include a CPU in one package, a DSP in another package, a GPU in yet another package, and an FPGA in still yet another package.

Figure 12:
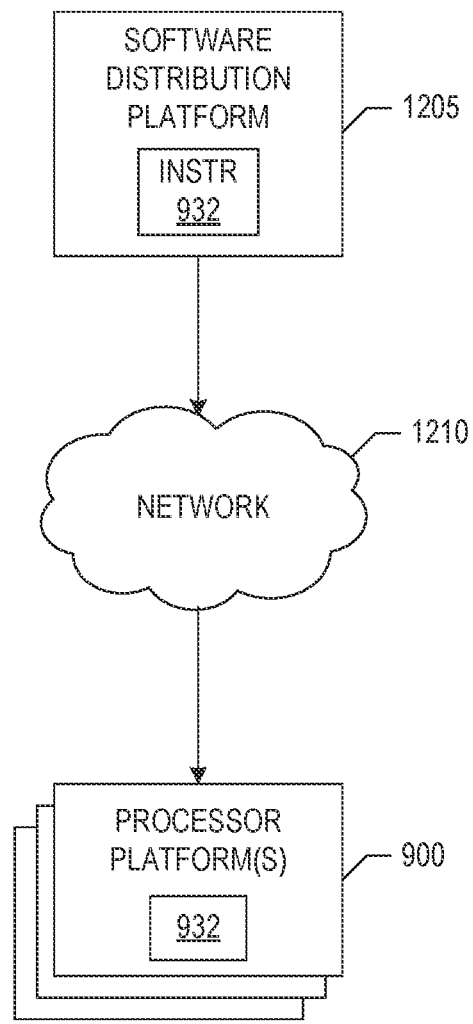
FIG. 12 is a block diagram of an example software distribution platform (e.g., one or more servers) to distribute software (e.g., software corresponding to the example machine readable instructions of FIGS. 4-6) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1205 to distribute software such as the example machine readable instructions 932 of FIG. 9 to hardware devices owned and/or operated by third parties is illustrated in FIG. 12. The example software distribution platform 1205 may be implemented by any computer server, data facility, cloud service, etc., capable of storing and transmitting software to other computing devices. The third parties may be customers of the entity owning and/or operating the software distribution platform 1205. For example, the entity that owns and/or operates the software distribution platform 1205 may be a developer, a seller, and/or a licensor of software such as the example machine readable instructions 932 of FIG. 9. The third parties may be consumers, users, retailers, OEMs, etc., who purchase and/or license the software for use and/or re-sale and/or sub-licensing. In the illustrated example, the software distribution platform 1205 includes one or more servers and one or more storage devices. The storage devices store the machine readable instructions 932, which may correspond to the example machine readable instructions 400 of FIGS. 4-6, as described above. The one or more servers of the example software distribution platform 1205 are in communication with a network 1210, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 932 from the software distribution platform 1205. For example, the software, which may correspond to the example machine readable instructions 400 of FIGS. 4-6, may be downloaded to the example processor platform 900, which is to execute the machine readable instructions 932 to implement the system to manage energy usage and compute performance. In some examples, one or more servers of the software distribution platform 1205 periodically offer, transmit, and/or force updates to the software (e.g., the example machine readable instructions 932 of FIG. 9) to ensure improvements, patches, updates, etc., are distributed and applied to the software at the end user devices.

From the foregoing, it will be appreciated that example systems, methods, apparatus, and articles of manufacture have been disclosed that manage energy usage and compute performance. Disclosed systems, methods, apparatus, and articles of manufacture improve the efficiency of using a computing device by matching computer hardware configurations with SoC workload, user activities, user preferences, system configurations, and other parameters. Examples disclosed herein improve computer performance management and reduce energy waste by dynamically adjusting performance parameters in response to changing conditions associated with a device. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to manage energy usage and compute performance are disclosed herein. Further examples and combinations thereof include the following:

Example 1 includes a compute device to manage energy usage and compute performance comprising at least one memory, instructions, and processor circuitry to execute the instructions to determine a system power mode based on first telemetry data associated with the compute device, provide user activity data and second telemetry data associated with the compute device to a classification system, and configure a plurality of parameters to manage performance of the compute device based on a classification by the classification system.

Example 2 includes the compute device of example 1, wherein the classification system is a trained machine learning model.

Example 3 includes the compute device of example 1 or example 2, wherein the processor circuitry is to determine the system power mode from a set of predefined power modes.

Example 4 includes the compute device of example 3, wherein the set of predefined power modes consists of first, second, and third power modes, the first power mode to configure the compute device to consume less power than the second power mode, the second power mode to configure the compute device to consume less power than the third power mode.

Example 5 includes the compute device of any of the previous examples, wherein the first telemetry data includes a battery charge state and a determination the compute device is coupled to an alternating current source.

Example 6 includes the compute device of example 5, wherein the first telemetry data further includes ambient environment data, system configuration data, and a customer preference.

Example 7 includes the compute device of any of the previous examples, wherein the second telemetry data includes system on a chip workload information and a user-defined configuration setting.

Example 8 includes the compute device any of the previous examples, wherein the plurality of parameters includes processor frequency, wireless communication enablement, graphics processor enablement, and secondary storage enablement.

Example 9 includes the compute device of any of the previous examples, wherein ones of the plurality of parameters can be configured to a set of parameter values, each set of parameter values corresponding to a performance state of the compute device.

Example 10 includes the compute device of any of examples 2 to 9, wherein the classification is a first classification associated with a burst workload, wherein the plurality of parameters is a first plurality of parameters, and wherein the processor circuitry is to execute the instructions to configure the first plurality of parameters to increase power consumption by the compute device, and after the first plurality of parameters is configured, in response to a change in a primary application associated with the burst workload, configure a second plurality of parameters to reduce power consumption by the compute device.

Example 11 includes a compute device to manage energy usage and compute performance comprising means for determining a system power mode based on first telemetry data associated with the compute device, means for providing user activity data and second telemetry data associated with the compute device to a classification system, and means for configuring a plurality of parameters to manage performance of the compute device based on a classification by the classification system.

Example 12 includes the compute device of example 11, wherein the classification system is a trained machine learning model.

Example 13 includes the compute device of example 11 or example 12, wherein the means for determining is to determine the system power mode from a set of predefined power modes.

Example 14 includes the compute device of example 13, wherein the set of predefined power modes consists of first, second, and third power modes, the first power mode to configure the compute device to consume less power than the second power mode, the second power mode to configure the compute device to consume less power than the third power mode.

Example 15 includes the compute device of any of the previous examples, wherein the first telemetry data includes a battery charge state and a determination the compute device is coupled to an alternating current source.

Example 16 includes the compute device of example 15, wherein the first telemetry data further includes ambient environment data, system configuration data, and a customer preference.

Example 17 includes the compute device of any of the previous examples, wherein the second telemetry data includes system on a chip workload information and a user-defined configuration setting.

Example 18 includes the compute device of any of the previous examples, wherein the plurality of parameters includes processor frequency, wireless communication enablement, graphics processor enablement, and secondary storage enablement.

Example 19 includes the compute device of any of the previous examples, wherein ones of the plurality of parameters can be configured to a set of parameter values, each set of parameter values corresponding to a performance state of the compute device.

Example 20 includes the compute device of any of examples 12 to 19, wherein the classification is a first classification associated with a burst workload, wherein the plurality of parameters is a first plurality of parameters, and wherein the means for configuring is to configure the first plurality of parameters to increase power consumption by the compute device, and after the first plurality of parameters is configured, in response to a change in a primary application associated with the burst workload, the means for configuring is to configure a second plurality of parameters to reduce power consumption by the compute device.

Example 21 includes a non-transitory computer readable storage medium comprising instructions which, when executed, cause processor circuitry to determine a system power mode based on first telemetry data associated with a compute device, provide user activity data and second telemetry data associated with the compute device to a classification system, and configure a plurality of parameters to manage performance of the compute device based on a classification by the classification system.

Example 22 includes the non-transitory computer readable storage medium of example 21, wherein the classification system is a trained machine learning model.

Example 23 includes the non-transitory computer readable storage medium of example 21 or example 22, wherein the instructions, when executed, cause the processor circuitry to determine the system power mode from a set of predefined power modes.

Example 24 includes the non-transitory computer readable storage medium of example 23, wherein the set of predefined power modes consists of first, second, and third power modes, the first power mode to configure the compute device to consume less power than the second power mode, the second power mode to configure the compute device to consume less power than the third power mode.

Example 25 includes the non-transitory computer readable storage medium of any of the previous examples, wherein the first telemetry data includes a battery charge state and a determination the compute device is coupled to an alternating current source.

Example 26 includes the non-transitory computer readable storage medium of example 25, wherein the first telemetry data further includes ambient environment data, system configuration data, and a customer preference.

Example 27 includes the non-transitory computer readable storage medium of any of the previous examples, wherein the second telemetry data includes system on a chip workload information and a user-defined configuration setting.

Example 28 includes the non-transitory computer readable storage medium of any of the previous examples, wherein the plurality of parameters includes processor frequency, wireless communication enablement, graphics processor enablement, and secondary storage enablement.

Example 29 includes the non-transitory computer readable storage medium of any of the previous examples, wherein ones of the plurality of parameters can be configured to a set of parameter values, each set of parameter values corresponding to a performance state of the compute device.

Example 30 includes the non-transitory computer readable storage medium of any of examples 22 to 29, wherein the classification is a first classification associated with a burst workload, wherein the plurality of parameters is a first plurality of parameters, and wherein the instructions, when executed, cause the processor circuitry to configure the first plurality of parameters to increase power consumption by the compute device, and after the first plurality of parameters is configured, in response to a change in a primary application associated with the burst workload, configure a second plurality of parameters to reduce power consumption by the compute device.

Example 31 includes a method for managing energy usage and performance of a compute device, the method comprising determining, by executing an instruction with processor circuitry, a system power mode based on first telemetry data associated with the compute device, providing, by executing an instruction with the processor circuitry, user activity data and second telemetry data associated with the compute device to a classification system, and configuring, by executing an instruction with the processor circuitry, a plurality of parameters to manage performance of the compute device based on a classification by the classification system.

Example 32 includes the method of example 31, wherein the classification system is a trained machine learning model.

Example 33 includes the method of example 31 or example 32, further including determining the system power mode from a set of predefined power modes.

Example 34 includes the method of example 33, wherein the set of predefined power modes consists of first, second, and third power modes, the first power mode to configure the compute device to consume less power than the second power mode, the second power mode to configure the compute device to consume less power than the third power mode.

Example 35 includes the method of any of the previous examples, wherein the first telemetry data includes a battery charge state and a determination the compute device is coupled to an alternating current source.

Example 36 includes the method of example 35, wherein the first telemetry data further includes ambient environment data, system configuration data, and a customer preference.

Example 37 includes the method of any of the previous examples, wherein the second telemetry data includes system on a chip workload information and a user-defined configuration setting.

Example 38 includes the method of any of the previous examples, wherein the plurality of parameters includes processor frequency, wireless communication enablement, graphics processor enablement, and secondary storage enablement.

Example 39 includes the method of any of the previous examples, wherein ones of the plurality of parameters can be configured to a set of parameter values, each set of parameter values corresponding to a performance state of the compute device.

Example 40 includes the method of any of examples 32 to 39, wherein the classification is a first classification associated with a burst workload, wherein the plurality of parameters is a first plurality of parameters, and further including configuring the first plurality of parameters to increase power consumption by the compute device, and after the first plurality of parameters is configured, in response to a change in a primary application associated with the burst workload, configuring a second plurality of parameters to reduce power consumption by the compute device. The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A compute device to manage energy usage and compute performance comprising:
at least one memory;
instructions; and
processor circuitry to execute the instructions to:
determine a system power mode based on first telemetry data associated with the compute device;
determine user activity data and second telemetry data associated with the compute device to a classification system;
obtain a classification of a workload for the system based on the system power mode, the second telemetry data, and the user activity data; and
configure a plurality of parameters to manage performance of the compute device based on the classification of the workload by the classification system and a normalized foreground ratio per processing unit of the compute device.

2. The compute device of claim 1, wherein the classification system is a trained machine learning model.

3. The compute device of claim 1, wherein the processor circuitry is to determine the system power mode from a set of predefined power modes.

4. The compute device of claim 3, wherein the set of predefined power modes consists of first, second, and third power modes, the first power mode to configure the compute device to consume less power than the second power mode, the second power mode to configure the compute device to consume less power than the third power mode.

5. The compute device of claim 1, wherein the first telemetry data includes a battery charge state and a determination that the compute device is coupled to an alternating current source.

6. The compute device of claim 5, wherein the first telemetry data further includes ambient environment data, system configuration data, and a customer preference.

7. The compute device of claim 1, wherein the second telemetry data includes system on a chip workload information and a user-defined configuration setting.

8. The compute device of claim 1, wherein the plurality of parameters includes processor frequency, wireless communication enablement, graphics processor enablement, and secondary storage enablement.

9. The compute device of claim 1, wherein ones of the plurality of parameters can be configured to a set of parameter values, each set of parameter values corresponding to a performance state of the compute device.

10. The compute device of claim 2, wherein the classification is a first classification associated with a burst workload, wherein the plurality of parameters is a first plurality of parameters, and wherein the processor circuitry is to execute the instructions to:
configure the first plurality of parameters to increase power consumption by the compute device; and after the first plurality of parameters is configured, in response to a change in a primary application associated with the burst workload, configure a second plurality of parameters to reduce power consumption by the compute device.

11. A non-transitory computer readable storage medium comprising instructions which, when executed, cause processor circuitry to:
- determine a system power mode based on first telemetry data associated with a compute device;
- determine user activity data and second telemetry data associated with the compute device to a classification system;
- obtain a classification of a workload for the system based on the system power mode, the second telemetry data, and the user activity data; and
- configure a plurality of parameters to manage performance of the compute device based on the classification of the workload by the classification system and a normalized foreground ratio per processing unit of the compute device.

12. The non-transitory computer readable storage medium of claim 11, wherein the classification system is a trained machine learning model.

13. The non-transitory computer readable storage medium of claim 11, wherein the instructions, when executed, cause the processor circuitry to determine the system power mode from a set of predefined power modes.

14. The non-transitory computer readable storage medium of claim 13, wherein the set of predefined power modes consists of first, second, and third power modes, the first power mode to configure the compute device to consume less power than the second power mode, the second power mode to configure the compute device to consume less power than the third power mode.

15. The non-transitory computer readable storage medium of claim 11, wherein the first telemetry data includes a battery charge state and a determination that the compute device is coupled to an alternating current source.

16. The non-transitory computer readable storage medium of claim 15, wherein the first telemetry data further includes ambient environment data, system configuration data, and a customer preference.

17. The non-transitory computer readable storage medium of claim 12, wherein the classification is a first classification associated with a burst workload, wherein the plurality of parameters is a first plurality of parameters, and wherein the instructions, when executed, cause the processor circuitry to:
- configure the first plurality of parameters to increase power consumption by the compute device; and
- after the first plurality of parameters is configured, in response to a change in a primary application associated with the burst workload, configure a second plurality of parameters to reduce power consumption by the compute device.

18. A method for managing energy usage and performance of a compute device, the method comprising:
- determining, by executing an instruction with processor circuitry, a system power mode based on first telemetry data associated with the compute device;
- determining, by executing an instruction with the processor circuitry, user activity data and second telemetry data associated with the compute device to a classification system;
- obtaining, by executing an instruction with the processor circuitry, a classification of a workload for the system based on the system power mode, the second telemetry data, and the user activity data; and
- configuring, by executing an instruction with the processor circuitry, a plurality of parameters to manage performance of the compute device based on the classification of the workload by the classification system and a normalized foreground ratio per processing unit of the compute device.

19. The method of claim 18, wherein the classification system is a trained machine learning model.

20. The method of claim 18, further including determining the system power mode from a set of predefined power modes.

21. The method of claim 20, wherein the set of predefined power modes consists of first, second, and third power modes, the first power mode to configure the compute device to consume less power than the second power mode, the second power mode to configure the compute device to consume less power than the third power mode.

* * * * *